US011049390B2

(12) United States Patent
Mubarek

(10) Patent No.: US 11,049,390 B2
(45) Date of Patent: Jun. 29, 2021

(54) METHOD, APPARATUS, AND SYSTEM FOR COMBINING DISCONTINUOUS ROAD CLOSURES DETECTED IN A ROAD NETWORK

(71) Applicant: HERE GLOBAL B.V., Eindhoven (NL)

(72) Inventor: Omer Mubarek, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 295 days.

(21) Appl. No.: 16/286,253

(22) Filed: Feb. 26, 2019

(65) Prior Publication Data

US 2020/0273328 A1  Aug. 27, 2020

(51) Int. Cl.
  *G08G 1/01*  (2006.01)
  *G01C 21/36*  (2006.01)
  *G06F 16/29*  (2019.01)

(52) U.S. Cl.
  CPC ....... *G08G 1/0133* (2013.01); *G01C 21/3691* (2013.01); *G06F 16/29* (2019.01)

(58) Field of Classification Search
  CPC .. G08G 1/0133; G08G 1/0141; G08G 1/0112; G01C 21/3691; G01C 21/3841; G01C 21/3822; G06F 16/29
  See application file for complete search history.

(56) References Cited

U.S. PATENT DOCUMENTS

| | | | | |
|---|---|---|---|---|
| 7,623,963 B2* | 11/2009 | Nomura | ............. | G01C 21/3484 701/417 |
| 8,606,511 B2* | 12/2013 | Johnson | ............. | G01C 21/3415 701/414 |
| 9,091,561 B1* | 7/2015 | Weir | .................. | G01C 21/3617 |
| 9,104,729 B2* | 8/2015 | Dong | ................. | G06F 16/2455 |
| 9,928,743 B2* | 3/2018 | Eilertsen | .......... | G08G 1/096775 |
| 10,192,432 B2* | 1/2019 | Lorkowski | ........... | G08G 1/0112 |
| 2009/0281850 A1* | 11/2009 | Bruce | .................. | H04W 4/029 705/80 |
| 2013/0332057 A1* | 12/2013 | Moore | .................... | G06T 17/05 701/118 |
| 2013/0345955 A1* | 12/2013 | Tashiro | .................... | G08G 1/00 701/118 |
| 2014/0278055 A1* | 9/2014 | Wang | .................... | G16B 99/00 701/409 |

(Continued)

*Primary Examiner* — Mussa A Shaawat
(74) *Attorney, Agent, or Firm* — Ditthavong, Steiner & Mlotkowski

(57) ABSTRACT

An approach is provided for combining discontinuous road closures detected in a road network. The approach, for example, involves retrieving a roadway graph including one or more open segments and at least two discontinuous closed segments. The approach also involves computing an importance weight for road links of the segments of the roadway graph. The importance weight is based on one or more attributes of the road links. The approach further involves computing a closure confidence score for the one or more open segments and/or the at least two closed segments based on the importance weight and a link closure confidence score for each link. The approach further involves changing or not changing a road closure state of the open and/or closed segments based on the closure confidence score and a minimum distance threshold between the at least two closed segments.

20 Claims, 18 Drawing Sheets

(56) References Cited

U.S. PATENT DOCUMENTS

| | | | |
|---|---|---|---|
| 2015/0032366 A1* | 1/2015 | Man | H04W 4/024 |
| | | | 701/412 |
| 2016/0109254 A1* | 4/2016 | Rozman | G01C 21/3484 |
| | | | 701/468 |
| 2016/0275787 A1* | 9/2016 | Kesting | G06F 16/29 |
| 2016/0284212 A1* | 9/2016 | Tatourian | G08G 1/096725 |
| 2016/0358468 A1* | 12/2016 | McGavran | G01C 21/3492 |
| 2017/0138752 A1* | 5/2017 | Mermelstein | G08G 1/012 |
| 2018/0136003 A1* | 5/2018 | Perkins | G01C 21/362 |
| 2018/0267537 A1* | 9/2018 | Kroop | B60W 10/20 |
| 2018/0376305 A1* | 12/2018 | Ramalho de Oliveira | |
| | | | G08G 1/096775 |
| 2019/0156667 A1* | 5/2019 | Arshad | G01C 21/3415 |
| 2020/0090503 A1* | 3/2020 | Rolf | G08G 1/0129 |
| 2020/0105134 A1* | 4/2020 | Pietrobon | G01C 21/32 |
| 2020/0111349 A1* | 4/2020 | Mubarek | G08G 1/0141 |
| 2020/0111357 A1* | 4/2020 | Mubarek | G01C 21/3694 |
| 2020/0240791 A1* | 7/2020 | Patault | G01C 21/3492 |

\* cited by examiner

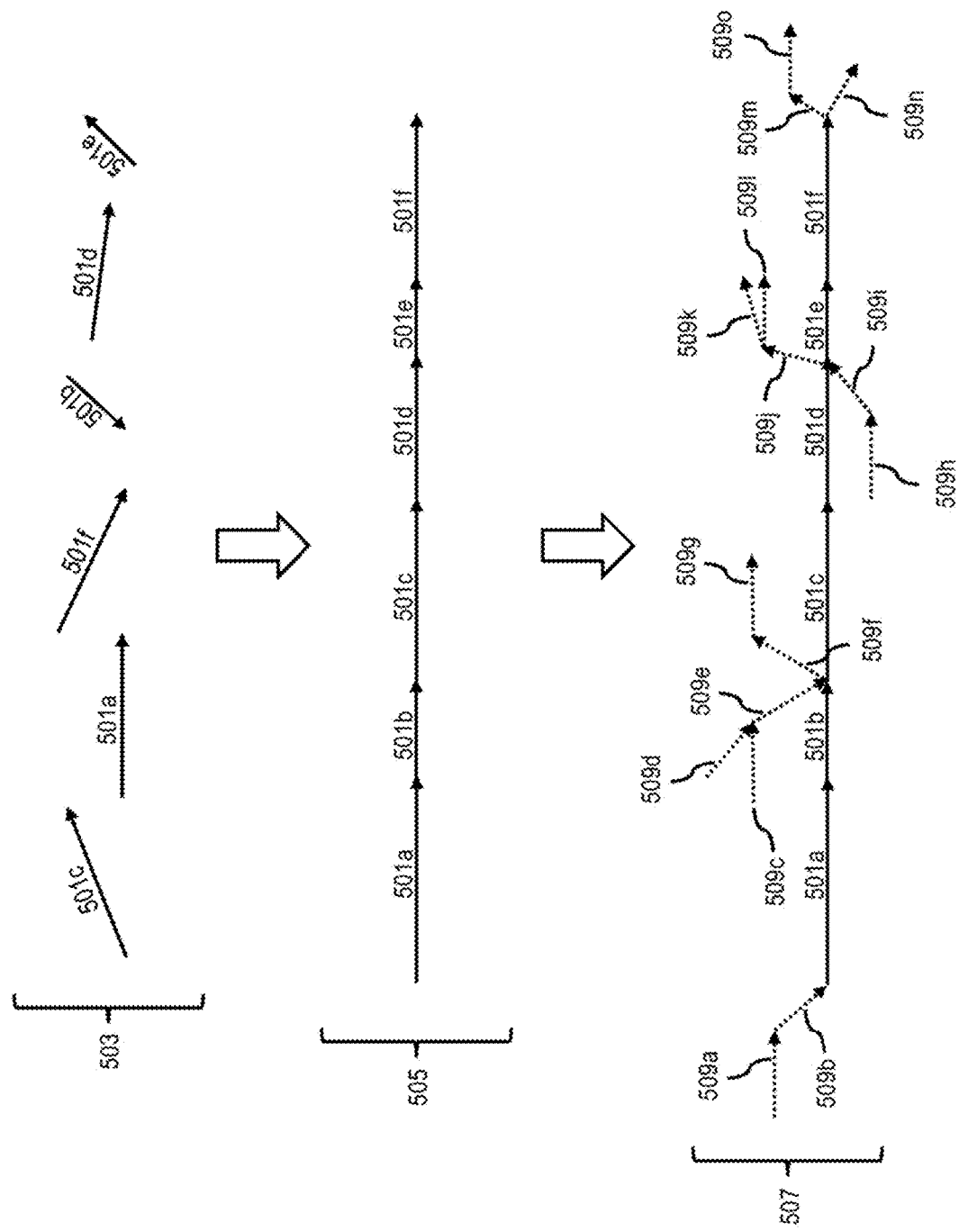

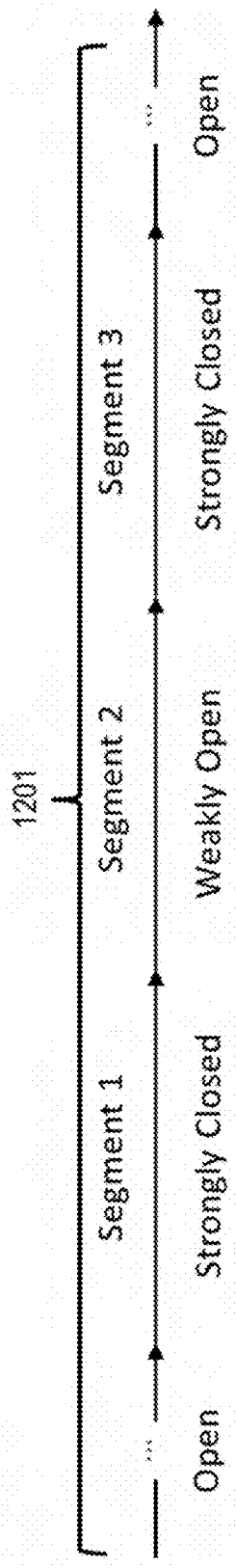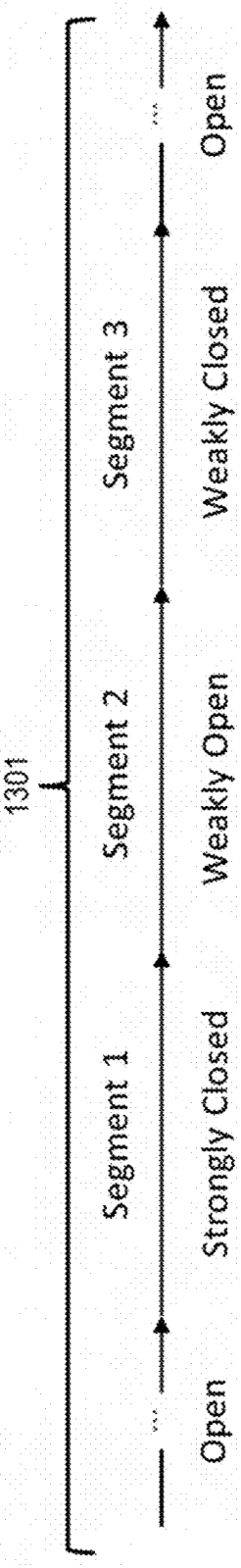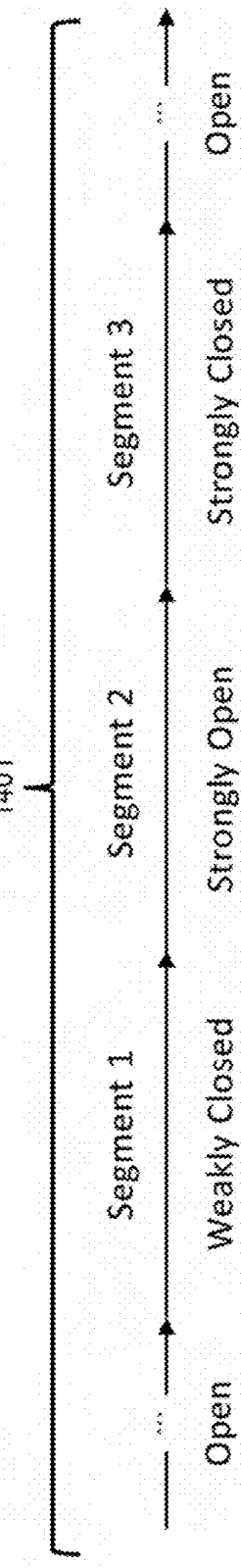

1801

METHOD, APPARATUS, AND SYSTEM FOR COMBINING DISCONTINUOUS ROAD CLOSURES DETECTED IN A ROAD NETWORK

BACKGROUND

Providing data on traffic incidents (e.g., abnormalities in traffic that can affect traffic flow such as accidents, lane closures, road closures, etc.) is an important function for map service providers. In particular, while most traffic incidents can have at least some negative impact on traffic, road closures can be the most severe because no cars can go through the affected roadway. The lack of knowledge about a road closure can have enormous negative impact on trip planning, routing, and estimated time of arrival. Therefore, traffic service providers face significant technical challenge to reporting road closures accurately. For example, road closure reports generally are reported with respect to individual road segments or links or a road network. This can create inconsistencies where road closures may be reported or detected as discontinuous segments when they should be combined to more accurately actual closure states.

SOME EXAMPLE EMBODIMENTS

Therefore, there is a need for combining discontinuous road closure detected in a road network.

According to one embodiment, a computer-implemented method comprises retrieving a roadway graph including one or more open segments and at least two closed segments. The at least two closed segments are discontinuous. The method also comprises computing an importance weight for a plurality of road links of the one or more open segments and the at least two closed segments. The importance weight is based on one or more attributes of the plurality of road links. The method further comprises computing a closure confidence score for the one or more open segments, the at least two closed segments, or a combination thereof based on the importance weight and a link closure confidence score for each of the plurality of links. The method further comprises changing or not changing a road closure state of the one or more open segments, the at least two closed segments, or combination thereof based on the closure confidence score and a minimum distance threshold between the at least two closed segments.

According to another embodiment, an apparatus comprises at least one processor, and at least one memory including computer program code for one or more computer programs, the at least one memory and the computer program code configured to, with the at least one processor, cause, at least in part, the apparatus to retrieve a roadway graph including one or more open segments and at least two closed segments. The at least two closed segments are discontinuous. The apparatus is also caused to compute an importance weight for a plurality of road links of the one or more open segments and the at least two closed segments. The importance weight is based on one or more attributes of the plurality of road links. The apparatus is further caused to compute a closure confidence score for the one or more open segments, the at least two closed segments, or a combination thereof based on the importance weight and a link closure confidence score for each of the plurality of links. The apparatus is further caused to change or not change a road closure state of the one or more open segments, the at least two closed segments, or combination thereof based on the closure confidence score and a minimum distance threshold between the at least two closed segments.

According to another embodiment, a non-transitory computer-readable storage medium carries one or more sequences of one or more instructions which, when executed by one or more processors, cause, at least in part, an apparatus to retrieve a roadway graph including one or more open segments and at least two closed segments. The at least two closed segments are discontinuous. The apparatus is also caused to compute an importance weight for a plurality of road links of the one or more open segments and the at least two closed segments. The importance weight is based on one or more attributes of the plurality of road links. The apparatus is further caused to compute a closure confidence score for the one or more open segments, the at least two closed segments, or a combination thereof based on the importance weight and a link closure confidence score for each of the plurality of links. The apparatus is further caused to change or not change a road closure state of the one or more open segments, the at least two closed segments, or combination thereof based on the closure confidence score and a minimum distance threshold between the at least two closed segments.

According to another embodiment, an apparatus comprises means for retrieving a roadway graph including one or more open segments and at least two closed segments. The at least two closed segments are discontinuous. The apparatus also comprises means for computing an importance weight for a plurality of road links of the one or more open segments and the at least two closed segments. The importance weight is based on one or more attributes of the plurality of road links. The apparatus further comprises means for computing a closure confidence score for the one or more open segments, the at least two closed segments, or a combination thereof based on the importance weight and a link closure confidence score for each of the plurality of links. The apparatus further comprises means for changing or not changing a road closure state of the one or more open segments, the at least two closed segments, or combination thereof based on the closure confidence score and a minimum distance threshold between the at least two closed segments.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5A and 5B are diagrams illustrating an example of constructing a roadway graph, according to one embodiment;

FIGS. 9-17 are diagrams of example base cases for combining discontinuous road closures, according to one embodiment;

DESCRIPTION OF SOME EMBODIMENTS

Examples of a method, apparatus, and computer program for combining discontinuous road closures are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
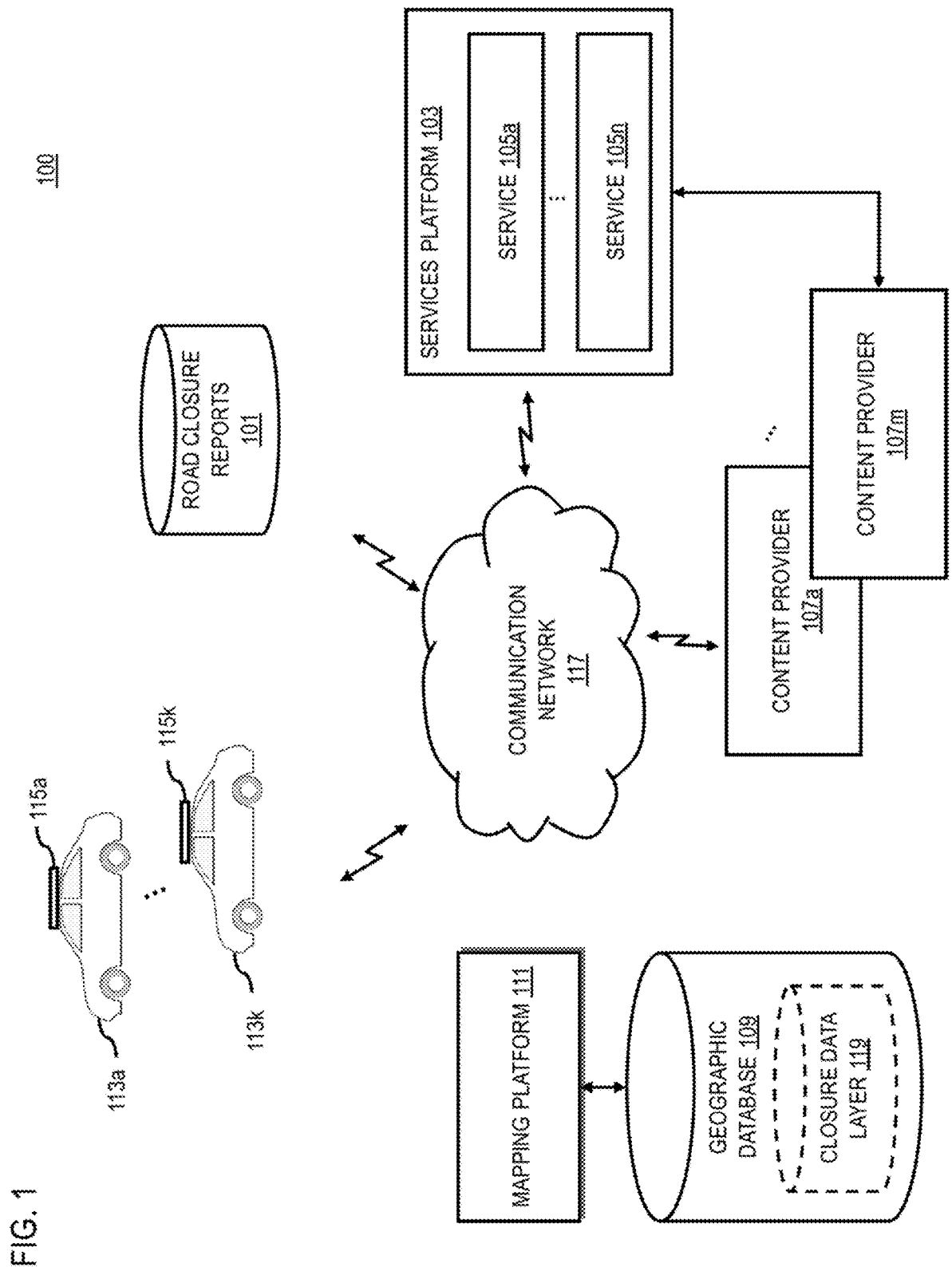
FIG. 1 is a diagram of a system capable of combining discontinuous road closure segments, according to one embodiment.

FIG. 1 is a diagram of a system capable of combining discontinuous road closure segments, according to one embodiment. As noted above, information on road closures occurring in a road network can be important for providing services such as trip planning, navigation routing or guidance, estimating time of arrival, and/or the like. Generally, traffic incidents such as road closures (e.g., road closure reports 101) are published by government/municipality agencies, local police, and/or third-party official/semi-official sources (e.g., a services platform 103, one or more services 105a-105n, one or more content providers 107a-107m, etc.). By way of example, the published road closure reports 101 can specify the roadway (e.g., by name or matched to specific road link records of digital map data such as a geographic database 109) that has been closed or partially closed to traffic (e.g., vehicular and/or non-vehicular traffic). Closure refers, for instance, to restricting traffic flow on a particular roadway such that no vehicle or a reduced number of vehicle (e.g., reduced with respect to an average free flow traffic volume on the roadway) is permitted or able to travel on the roadway.

In one embodiment, a traffic provider (e.g., via a mapping platform 111) monitors the feeds of the road closures reports 101, extracts the affected roadways (e.g., road segments or links), and provides traffic data and/or other functions based on the road closure reports 101 (e.g., displays the location of reported closures on the map, generates navigation routes to avoid reported road closures, etc.). Then, traditional traffic service providers wait for another message or road closure report 101 indicating that the road has opened to provide updated data and/or functions. In one embodiment, this type of incident reporting is referred to as "journalistic reporting."

In one embodiment, journalistic incident reports can be coupled with other information (e.g., GPS probe information collected from vehicles 113a-113k, also collectively referred to as vehicles 113) and verified automatically. This process involves monitoring (e.g., by the mapping platform 111) the reported road segment for the duration of the report and determining the closure state (e.g., whether the road segment is closed or open) periodically or based on events as they occur (e.g., vehicle activity). This is called, for instance, an "automatic road closure verification" methodology.

Furthermore, independent of journalistic reports, the system 100 (e.g., via the mapping platform 111) can monitor a set of roadways and detect road closures in the absence of journalistic reports based, for instance, on vehicle probe data, road sensors, or equivalent. This methodology is referred to as "automatic road closure detection." In one embodiment, the automatic closure verification and detection mechanisms of the mapping platform 111 can calculate a closure likelihood score for a road segment and based on this score. Based on the road closure score, the mapping platform 111 can classify the closure states of monitor road segments to close roads that are open, to open roads that are closed, and/or to take no action.

Figure 2A:
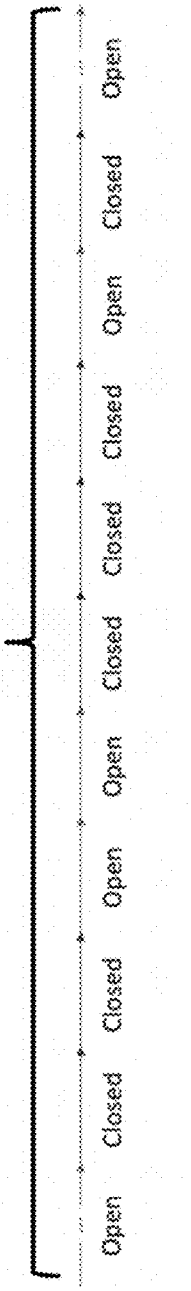
FIGS. 2A-2E are diagrams illustrating problematic road closure scenarios caused by discontinuous closure segments, according to one embodiment.

However, journalistic closure reports as well as automatic closure detection systems can sometimes report multiple discontinuous closed segments which are close to each other. This scenario is observed much more often with automatic closure verification/detection systems, which decide on a road segment's closure status by calculating a score or a probability. For example, when an automatic road closure verification system processes a set of road links, it calculates first a closure likelihood score for each of these links. Then, it uses this score to determine the closure state for that link, as either closed or open. This process can produce multiple closed but non-consecutive links (i.e., discontinuous road closures), as shown FIG. 2A. The example road segment 201 includes a sequence of road links (e.g., indicated by line segments denoted by arrows indicating the direction of travel of the road link) that include multiple closed and non-consecutive or discontinuous links.

Figure 2B:
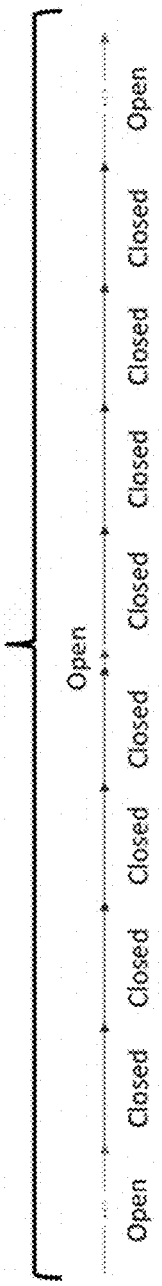
Figure 2C:
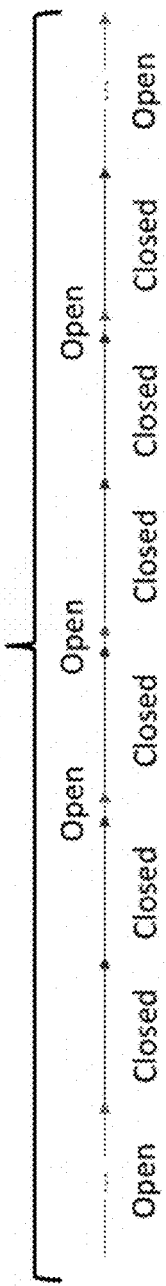

Depending on the length of open segments (e.g., links that are classified as open to traffic), alternating closures (e.g., links that are classified as closed to traffic) can be a sign of incorrect closure evaluation. For example, the road segment in question could be entirely closed with open segments being falsely evaluated or reported. FIGS. 2B and 2C illustrate two extreme cases for this scenario. FIG. 2B illustrates a road segment 211 that includes one very short open segment between longer stretches of closed segments, and FIG. 2C illustrates a road segment 221 that includes multiple very short open segments in between longer stretches of closed segments.

Figure 2D:
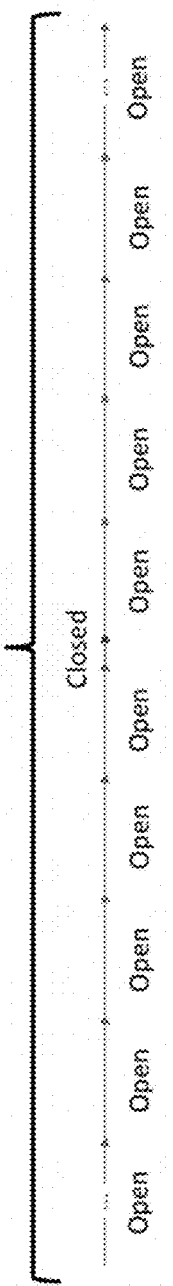
Figure 2E:
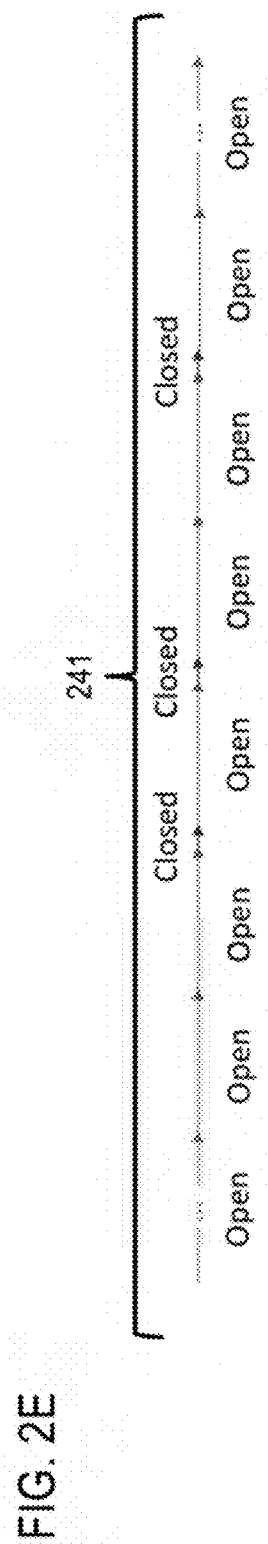

In another scenario, the road segment in question could be entirely open, with closed segments being falsely marked as closures. This scenario, which is the reciprocate of the scenario of FIGS. 2B and 2C, is shown in FIGS. 2D and 2E. FIG. 2D illustrates a road segment 231 that includes a very short closed segment between longer stretches of open segments, and FIG. 2E illustrates a road segment 241 that includes multiple very short closed segments in between longer stretches of open segments. Some of the closed or open segments could be legitimate or accurate, while some others might need correction.

Based on the above illustrated problematic scenarios among others, map services providers face significant technical challenges to automatically determining which open and/or closed segments of road segments with discontinuous road closures are likely to be correctly determined.

To address these problems, the system 100 introduces a technical solution with a capability to analyze an arbitrary road segment which contains multiple non-continuous closure segments. Depending on the analysis, the system 100 decides whether some or all of the closed segments are part of the same closure or whether there are multiple discontinuous closures. In one embodiment, it is assumed that a road closure has been either reported journalistically or automatically (e.g., via an automatic closure detection/verification system). In the case of journalistic reports, the closure can go through an automatic road closure verification system where the system builds a connected roadway network around the closure, referred as roadway graph (a mathematical graph) henceforth and evaluates each road segment in the reported closure. The result is a closure likelihood score associated with each road segment and a closure state (closed or open). In the case of automatically detected road closures (as opposed to journalistic reports), again a closure likelihood is calculated per road segment. Alternatively, in the next step, certain select road segments (e.g., those with high closure likelihood) can be passed through an automatic verification system above.

Whichever path is followed, it is assumed that the system 100 creates a roadway graph which comprises a set of road segments with respective closure likelihood scores. This graph with the closure likelihood scores or equivalent is the input to the various embodiments described herein for combining discontinuous road closures. In one embodiment, the system 100 processes the input roadway graph, evaluates road segments which could potentially be closures, and determines how many disconnected closure segments are in the roadway graph. After that, the system 100 either combines discontinuous closure segments as one closure, keeps them separate, or removes some of the potential closures.

In one embodiment, an open segment separating two closed segments of a roadway graph could be too long, such that it should not be treated as part of one segment with mixed closures. For instance, if the open segment between two closed segments is 20 kilometers long, the system 100 may not perform closure combining and/or correction on the entire stretch of road. Instead, the two closed segments on either side of the open segment can be evaluated and/or monitored on as separate subgraphs on their own.

By way of example, the embodiments describe herein provide at least the following advantages over conventional approaches:

The embodiments described herein provide an approach to go over discontinuous road closures which are close to each other and to decide whether the discontinuous road closures should be combined into one larger closure. In this way, the system 100 improves road closure accuracy.

The search space of the algorithm is limited to reported and/or detected road closures. Therefore, the complexity of combining road closures is reduced because the complexity grows with number of closed road segments (as opposed to all road segments in the world).

The system 100 allows automatic road closure verification and detection systems to operate in a simpler way because the system 100 takes care of clustering the closures in post-processing.

Journalistic reports may also report discontinuous closures which are actually part of one big closure. The system 100 also combines and/or corrects road closures provided in such reports.

Figure 3:
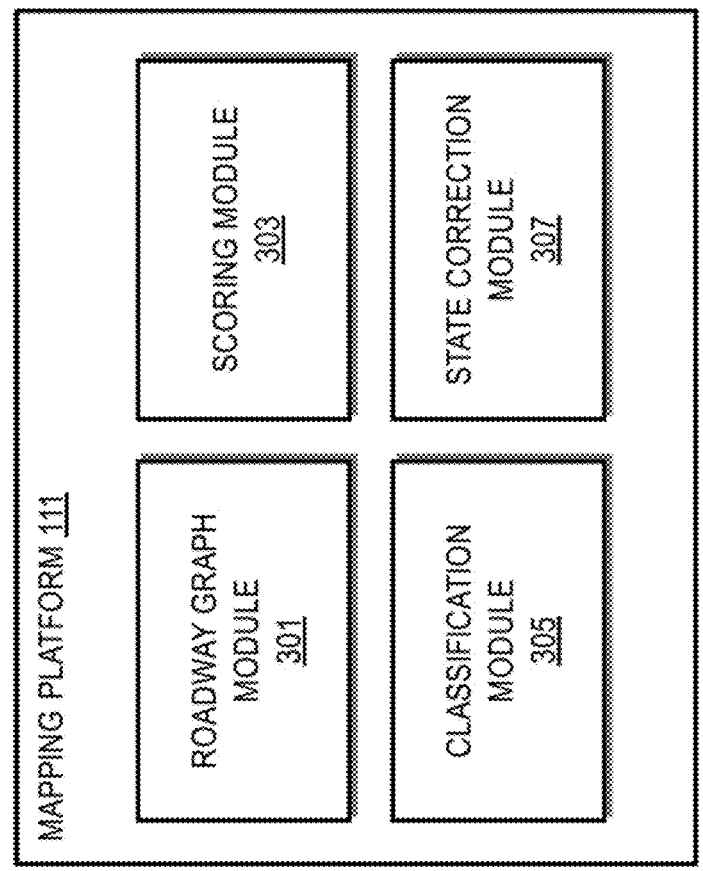
FIG. 3 is a diagram of the components of a mapping platform capable of combining discontinuous road closure segments, according to one embodiment.

In one embodiment, as shown in FIG. 3, the mapping platform 111 of the system 100 includes one or more components for combining discontinuous road closures according to the various embodiments described herein. It is contemplated that the functions of these components may be combined or performed by other components of equivalent functionality. As shown, in one embodiment, the mapping platform 111 includes a roadway graph module 301, scoring module 303, classification module 305, and state correction module 307. The above presented modules and components of the mapping platform 111 can be implemented in hardware, firmware, software, or a combination thereof. Though depicted as a separate entity in FIG. 1, it is contemplated that the mapping platform 111 may be implemented as a module of any of the components of the system 100 (e.g., a component of the vehicle 113, services platform 103, services 105a-105n (also collectively referred to as services 105), etc.). In another embodiment, one or more of the modules 301-307 may be implemented as a cloud-based service, local service, native application, or combination thereof. The functions of the mapping platform 111 and modules 301-307 are discussed with respect to FIGS. 4-17 below.

Figure 4:
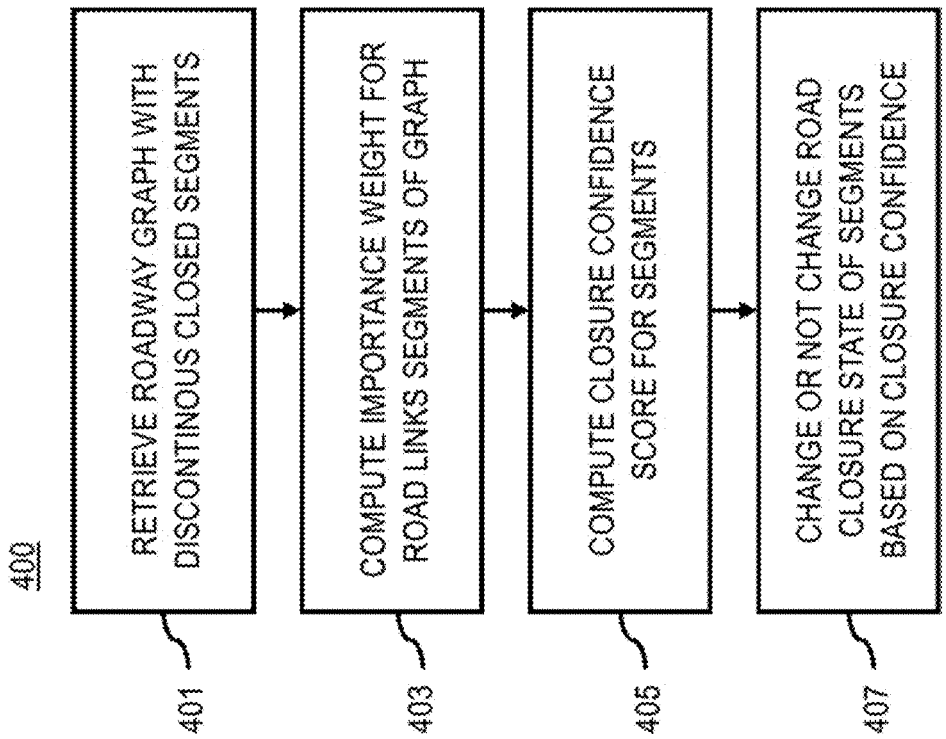
FIG. 4 is a flowchart of a process for combining discontinuous road closures detected in a road network, according to one embodiment.
Figure 21:
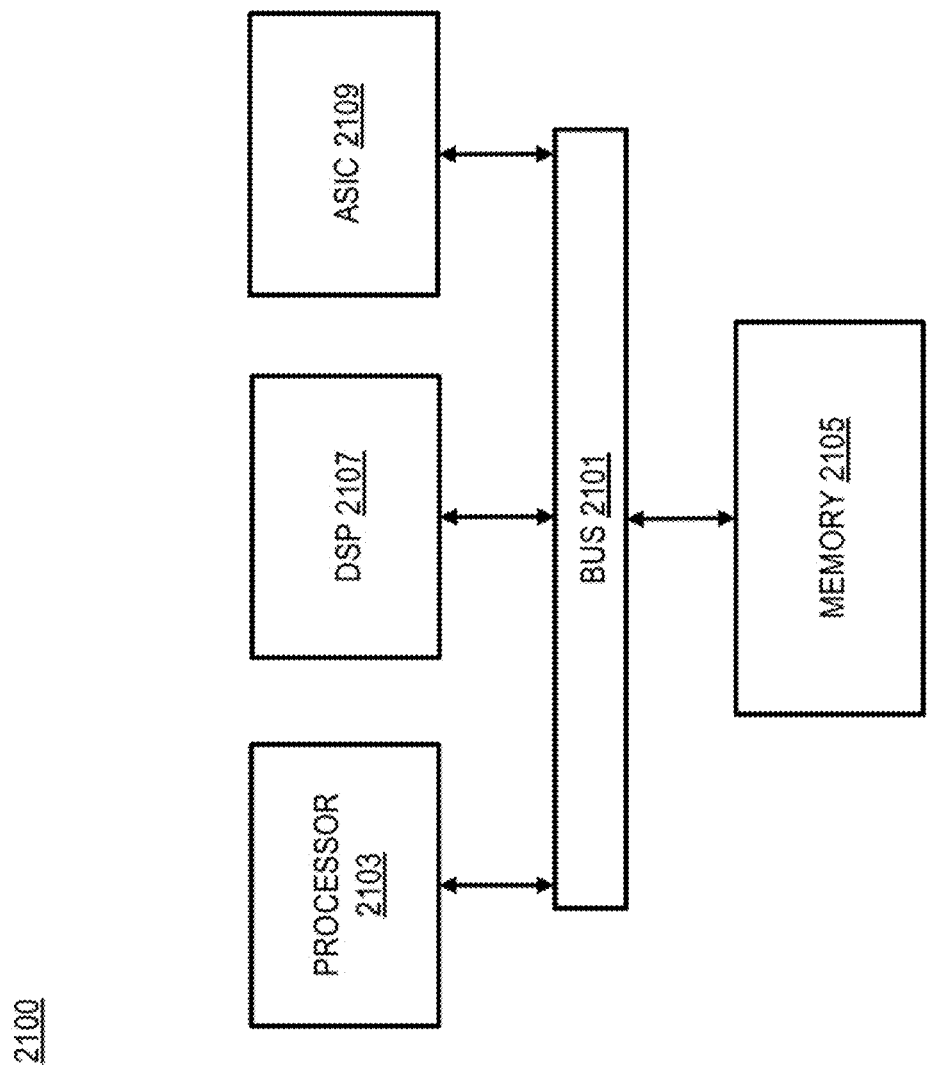
FIG. 21 is a diagram of a chip set that can be used to implement an embodiment.

FIG. 4 is a flowchart of a process for combining discontinuous road closures detected in a road network, according to one embodiment. In various embodiments, the mapping platform 111 and/or any of the modules 301-307 may perform one or more portions of the process 400 and may be implemented in, for instance, a chip set including a processor and a memory as shown in FIG. 21. As such, the mapping platform 111 and/or any of the modules 301-307 can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps.

In one embodiment, the process 400 provides for combining discontinuous according to rules and criteria including but not limited to:
(1) Multiple discontinuous closed segments are not allowed within a distance shorter than a minimum multiple closure length (THRESH_MIN_MULTI_CLOSURE_LENGTH). An example is, no more than one continuous closed segment is allowed within 50 meters.
(2) If two consecutive discontinuous closures are more than a maximum interclosure distance (THRESH_MAX_INTERCLOSURE_DISTANCE) apart, they cannot be combined. This means, the open superlinks between the closed superlinks remain open.
(3) Closed and/or open segments below minimum segment length (THRESH_MIN_SEGMENT_LENGTH) are ignored and their closure states are flipped to match their neighbors; hence removing discontinuous states. As an example, consider an open superlink between two closed superlinks and THRESH_MIN_SEGMENT_LENGTH=5 meters. If the open superlink in the middle is 4 meters long, its closure status is flipped from open to closed. This will result in one continuous closure over three superlinks.

To initiate the process 400, in step 401, the roadway graph module 301, retrieves a roadway graph including one or more open segments and at least two closed segments, wherein the at least two closed segments are discontinuous. In one embodiment, the roadway graph is constructed from discontinuous road closures (e.g., at least two road closures separated by an open road segment). The road closures can be reported journalistically or automatically, and/or determined using any equivalent means. The road closures can be stored as one or more road closure reports 101. It is contemplated that the road closure report 101 can be generated and/or transmitted in any data format and includes data indicating a location or roadway affected by a road closure. The data can include a direct indication of the affected link (e.g., by specifying the link IDs corresponding to the roadway or segments affected by the reported road closure), or an indirect indication (e.g., address or offset location that can then be map-matched or translated to corresponding links of the geographic database 109). In some embodiments, the road closure report 101 can optionally include other contextual data such as type of closure, duration of closure, timestamp information, and/or the like. For journalistic reports, the roadway graph module 301 monitors reports received from one or more entities (e.g., government/municipality agencies, police agency, and/or any other third-party source of road closure data). For automatic verification and/or detection, the roadway graph module 301 can perform or initiate monitoring of vehicle probe data from road segments of interest to classify or score a likelihood of a closure occurring on the road segments (e.g., based on probe volume, speed, location, heading, etc. meeting thresholds for classifying road segment as open or closed).

In one embodiment, if a roadway graph has not been generated as part of the road closure verification or detection process, the roadway graph module 301 can process map data (e.g., stored in the geographic database 109) to generate a roadway graph representing a spatial relationship between road segments affected by the reported road closure or within a proximity threshold of the reported road closure (e.g., spatial relationship between a first road segment with a reported road closure and then a second road segment flowing into or from the first road segment). In other words, the roadway graph module 301 builds a roadway graph or closure link graph comprising a connected set of road segments or links including the road links indicated in the road closure report 101. In one embodiment, a road link or segment is the unit representation of a roadway in a digital map such as the geographic database 109. As road segment can also be a combination of unit links. Generally, a roadway between two consecutive intersections can be represented by one or more links. However, a single link does not span more than the distance between two intersections.

In one embodiment, the roadway or closure link graph (i.e., used synonymously herein) is used to seal or designate the reported closure area and monitor traffic around and through the closure within the area represented by the closure link graph. As described above, a closure incident is reported on a stretch of roadway (e.g., via a road closure report 101). This closure report 101 is then converted into a set of links. As shown in FIG. 5A, these links (e.g., links 501a-501f, also collectively referred to as links 501) can be and unordered set 503 (e.g., unordered with respect to a spatial arrangement).

If the links 501 are unordered, the roadway graph module 301 initiates the building of the closure link graph around these links 501 by ordering the links 501 so that the end of one link is arranged to match the beginning of the next closest link based on the respective locations of their beginning and end nodes. The ordered set 505 of the links 501 is also illustrated in FIG. 5A. The ordered set 505 of the links 501 corresponds to the abstract representation of the physical structure road segments making up the roadway indicated in the road closure report 101.

Next, the roadway graph module 301 adds links upstream to and downstream from the reported closures to construct the closure link graph 507. Since these links (e.g., links 509a-509o, also collectively referred to as links 509) are not among the original links 501 identified in the road closure report 101, the links 509 are assumed to be open and not closed to traffic. The resulting the roadway or closure link graph 507 then includes the reportedly closed links 501 buffered by links 509 that are open for travel. In other words, with the addition of open upstream and downstream links 509, the closure (e.g., on links 501) is now isolated. For example, given the closure links 501, all traffic going into and out of the closure region can be monitored using the traffic flowing in the open links 509.

In one embodiment, the flow of traffic is determined by collecting probe data from vehicles. For example, the roadway graph module 301 retrieves probe data collected from vehicles traveling on the roadways corresponding to the closure link graph 507. In one embodiment, probe data includes raw GPS probes (e.g., probe points) sent from vehicles indicating their respective locations by, for instance, a latitude and longitude pair. Then, each probe point is placed onto a most probable link on the map using a map matching process. On example map-matching process works as described in the following section. A map is defined by a set of links and their geographic coordinates. Because GPS (or other similar location positioning technology) is not 100% accurate, the coordinates of a vehicle GPS probe most of the time do not fall onto a link perfectly. To account for this error, map matching algorithms take the coordinate of a GPS probe, and find the neighboring links whose coordinates are close to the probe. Then, the map matching process places the vehicle probe onto the most probable link based on pre-defined criteria of the specific map matching process or algorithm being used.

In one embodiment, to better control for map matching error, the roadway graph module 301 described herein works with vehicle paths instead of map matched vehicle probes. The reason is that map matched vehicle probes can be more are susceptible to map matching errors than vehicle paths. By way of example, a vehicle path or trajectory is derived from two consecutive map matched vehicle probes. The path can then be increased by adding new probe points on top of the previously calculated vehicle path as new probe points are collected.

In one embodiment, the roadway graph module 301 can process the probe data to calculate vehicle paths traversing the monitored closure link graph 407 according to the example process described below. Firstly, for a specific vehicle, the roadway graph module 301 takes the first and second probe points received, e.g., denoted as probe1 and probe2. If the time difference between these probes is more than a specified threshold, the roadway graph module 301 discards the initial probe1, and the sets probe1=probe2. The roadway graph module 301 then retrieves the next probe point to set as probe 2 to iteratively evaluate the time difference.

If the time difference is less than the specified threshold, the roadway graph module 301 builds a vehicle path from probe1 to probe2. It is contemplated that the roadway graph module 301 can use any path building process or algorithm such as but not limited to A* pathfinding or equivalent. The roadway graph module 301 then records the new path for the vehicle, discards probe1, sets probe1=probe2, and retrieves the next probe point to act as probe2 until all probe points collected for the specific vehicle have been processed.

In one embodiment, every vehicle can send its probe points (e.g., GPS probes) at a different frequency; this frequency can vary from 1 second to a few minutes. Therefore, as a vehicle drives through multiple links, there is no guarantee that it will send a probe from every link. For instance, if a vehicle drives at fast speeds over short links while sending a probe every 2 minutes, it would almost be certain that its two consecutive probes will arrive from non-neighboring links. This sporadic or sparse probe reporting can make it more technically challenging to build accurate vehicle paths.

To address this technical challenge, in one embodiment, as part of its link graph building process, the roadway graph module 301 can aggregate links and their probes where it makes sense into superlinks. In one embodiment, a superlink consists of ordered links such that if a vehicle travels through one of its links, it is guaranteed to travel through the other links of the same superlink as well. An example of a superlink is a section of a highway stretching between two entrance/exit ramps. When on this stretch a vehicle must go through all the links part when driving this stretch. Another example is a roadway between two intersections in a city road. Because a superlink comprises one or more links, superlinks are often longer than normal links of the geographic database 109, thereby increasing the probability that a probe point of a vehicle path would fall on the superlink than on a normal link. In addition, the superlinks can decrease the overall complexity of the closure link graph 507 without affecting the quality of the closure evaluation results, thereby reducing computing resources (e.g., processing resources, memory resources, bandwidth resources, etc.) associated with automatic evaluation of road closure reports according to the various embodiments described herein.

Figure 5B:
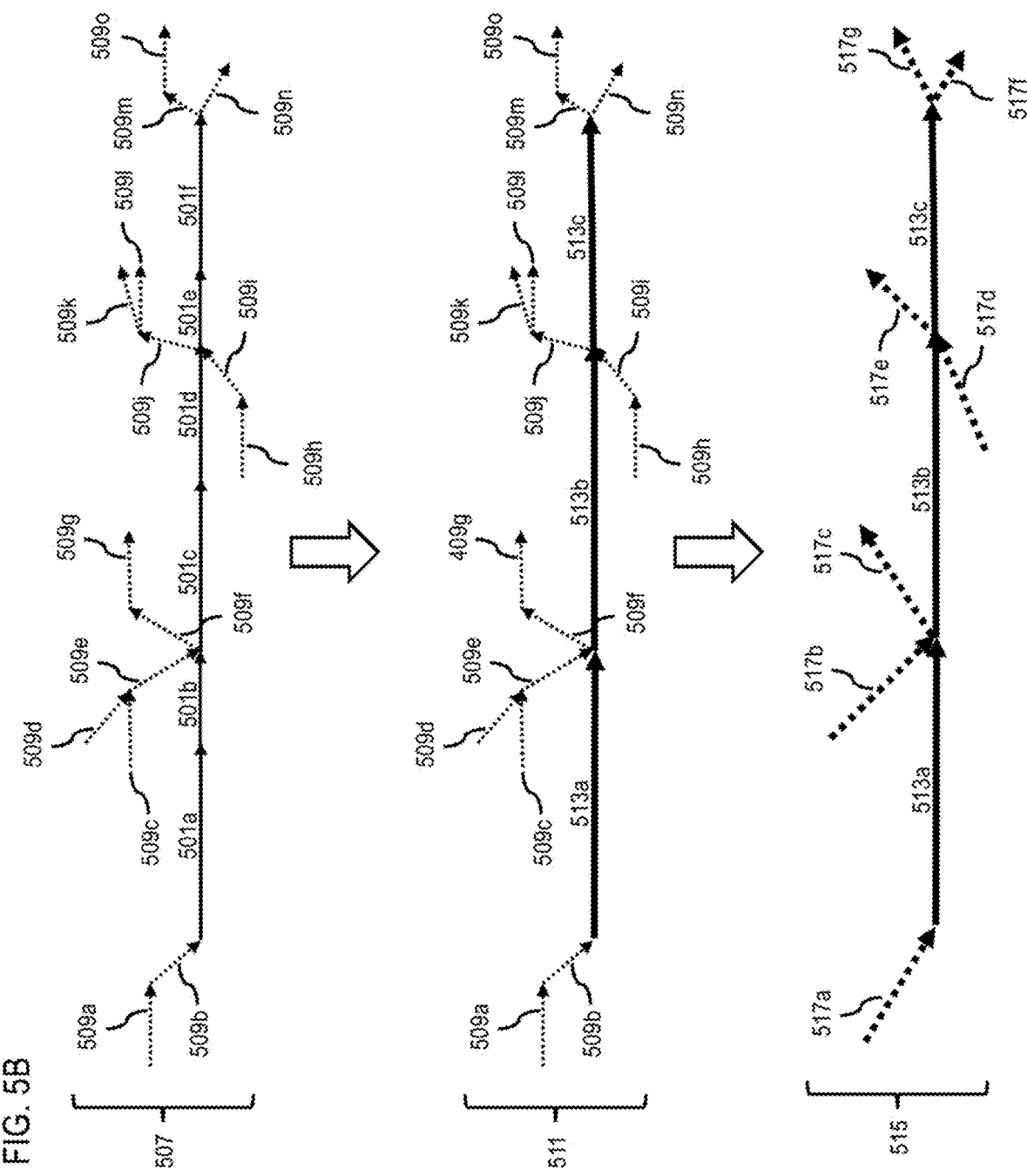
Figure 6:
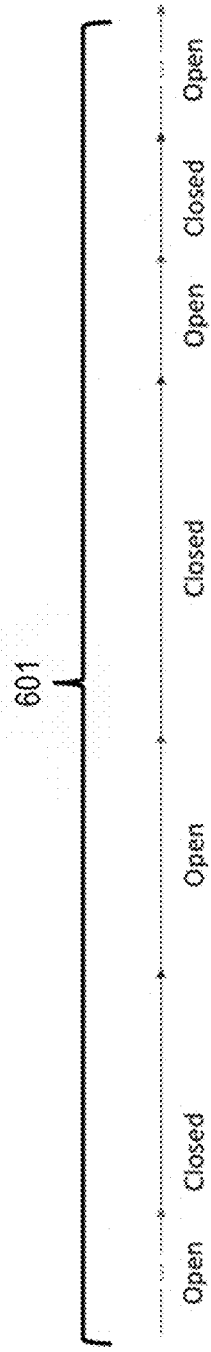
FIG. 6 is a diagram of a simplified road segment graph that combines consecutive open or closed segments, according to one embodiment.

FIG. 5B is diagram of an example of aggregating road links of the closure link graph 507 into superlinks, according to one embodiment. FIG. 5B continues the example closure link graph 507 of FIG. 5A and illustrates a first superlink graph 511 that is a version of the closure link graph 507 in which the reportedly closed links 501 are aggregated into respective superlinks. In this example, links 501*a* and 501*b* can form a superlink 513*a* because a vehicle on link 501*a* must also travel through link 501*b*. Similarly, links 501*c* and 501*d* can be aggregated as superlink 513*b*, and links 501*e* and 501*f* can be aggregated into superlink 513*c*.

In one embodiment, the upstream and downstream links 509 can be aggregated into superlinks in addition to the links 501 to construct superlink graph 515. For example, links 509*a* and 509*b* can be aggregated into superlink 517*a*, links 509*c*-509*e* can be aggregated into superlink 517*b*, links 509*f* and 509*g* can be aggregated into superlink 517*c*, links 509*h* and 509*i* can be aggregated into superlink 517*d*, links 509*j*-509*l* can be aggregated into superlink 517*e*, and links 509*m* and 509*o* can be aggregated into superlink 517*g*. Referring for instance to the example of FIGS. 5A and 5B, if a vehicle has probe points on link 501*a*, 501*c*, and 501*f*, the roadway graph module 301 can calculate the vehicle path to include links all links 501*a*-501*f* based on the superlinks 513*a*-513*c*. In one embodiment, links and superlinks can be used interchangeably in the various embodiments described herein. Therefore, where links are described without reference superlinks, it is contemplated that superlinks can be used in addition to or as alternate to links, and vice versa.

In one embodiment, consecutive closed links/superlinks and consecutive open links/superlinks can be further combined into larger segments. For example, consecutive closed links can be combined into one closed segment, and consecutive open links can be combined into one open segment. Returning to the example of FIG. 2A, the roadway graph module 301 can process the consecutive closed and open links of the road segment 201 to create a simplified road segment graph 601 of FIG. 6 that combines each of the consecutive open and closed segments into respective larger open or closed segments.

Figure 7:
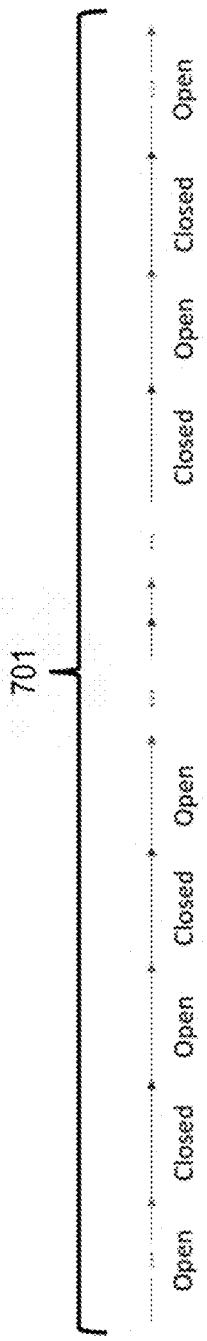
FIG. 7 illustrates an example of a general case of a road segment with discontinuous road closures, according to one embodiment.

As used herein, it is assumed that a "closed" or "open" segment can consist of one or multiple links/superlinks including combined consecutive links. FIG. 7 illustrates an example of the most general case of a road segment 701 with mixed or discontinuous closures and open roads. As shown, the road segment 701 includes alternating closed and open segments such that any two discontinuous closed segments are separated by an open segment.

Accordingly, the result of step 401 of the process 400 is that the roadway graph module 301 obtains a roadway graph (a.k.a., a road closure link graph) that is to be processed according to the embodiments described herein to combine and/or correct closed or open segments of the graph. The roadway graph identifies the road segment of interests and provides the closure confidence scores indicating the likelihood that a correspond link or road segment is closed.

In one embodiment, the scoring module 303 can further classified the open or closed states of segments of the roadway graph into one or more classifications based on the closure scores. By way of example, the classifications can include but is not limited to any one of the following:

Strongly Closed: Closed links/superlinks with closure scores (closure_score) greater than or equal to a strong closure threshold (THRESH_CLOSED_STRONG) are considered as strongly closed:
Superlink status=closed AND closure_score>=THRESH_CLOSED_STRONG Weakly Closed: Closed links/superlinks with closure scores less than THRESH_CLOSED_STRONG and greater than or equal to a weak closed threshold (THRESH_CLOSED_WEAK) are considered as weakly closed:
Superlink status=closed AND
THRESH_CLOSED_WEAK<=closure_score
<THRESH_CLOSED_STRONG Semi-Weakly Closed: This is a sub-category under weakly closed, such that:
Superlink status=closed AND
THRESH_CLOSED_SEMI_WEAK<=closure_score
<THRESH_CLOSED_STRONG,
where
THRESH_CLOSED_WEAK<=THRESH_CLOSED_SEMI_WEAK Strongly Open: Open superlinks with closure scores less than THRESH_OPEN_STRONG are considered as strongly open:
Superlink status=open AND closure_score<=THRESH_OPEN_STRONG Weakly Open: Open superlinks with closure scores greater than THRESH_OPEN_STRONG and less than or equal to THRESH_OPEN_WEAK:
Superlink status=open AND
THRESH_OPEN_STRONG<closure_score<=
THRESH_OPEN_WEAK Semi-Weakly Open: This is a sub-category under weakly open, such that:
Superlink status=open AND THRESH_OPEN_STRONG<closure_score<=THRESH_OPEN_SEMI_WEAK,
where
THRESH_OPEN_SEMI_WEAK<=
THRESH_OPEN_WEAK In other words, the scoring module 303 can optionally perform a classification the one or more open segments, the one or more closed segments, or a combination thereof of the roadway graph as strongly closed, weakly closed, semi-weakly closed, strongly open, weakly open, semi-weakly open, or a combination thereof based on the closure confidence score. Although the specification refers to the closure scores of the segments using the classifications described above, it is contemplated that the raw closure scores can be used instead in combination with the corresponding threshold values.

As discussed above, in one embodiment, it is assumed that the starting point of the process 400 is a connected superlink graph where each superlink has a closure probability score and based on this score an assigned closure state, e.g., either closed or open. The superlink graph can cover an arbitrarily large area, e.g., a small road network of a couple of blocks in a neighborhood, road network of an entire city, country, or even the world.

Figure 8A:
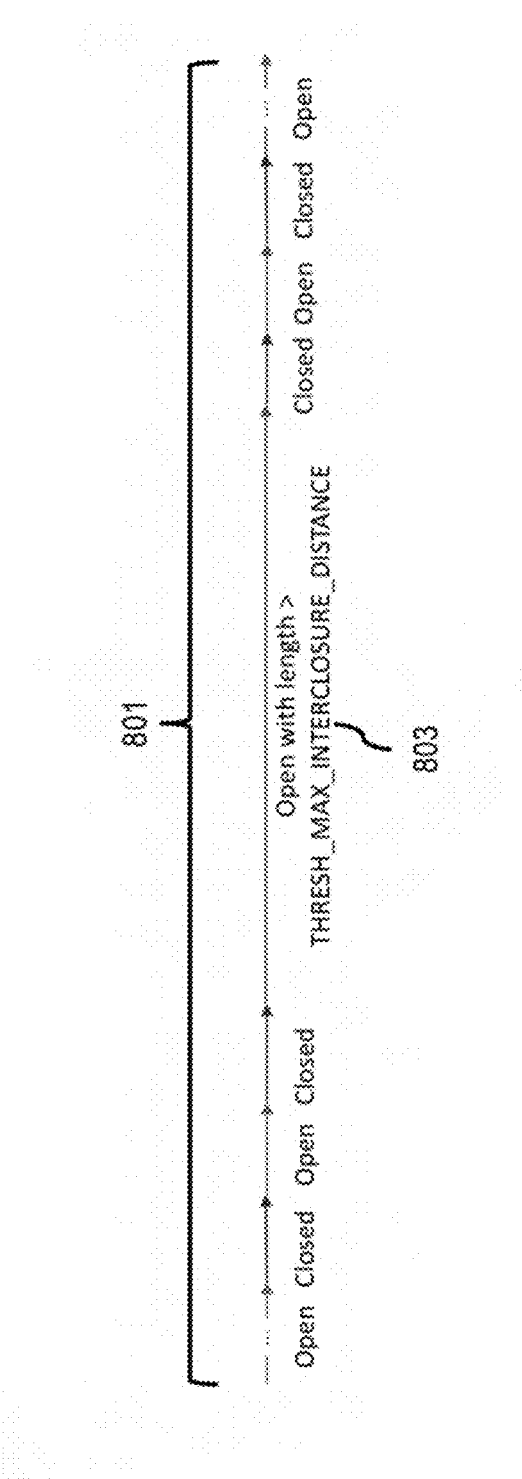
FIGS. 8A and 8B are diagrams illustrating examples of partitioning a roadway graph into subgraphs based on an interclosure distance threshold, according to one embodiment.
Figure 8B:
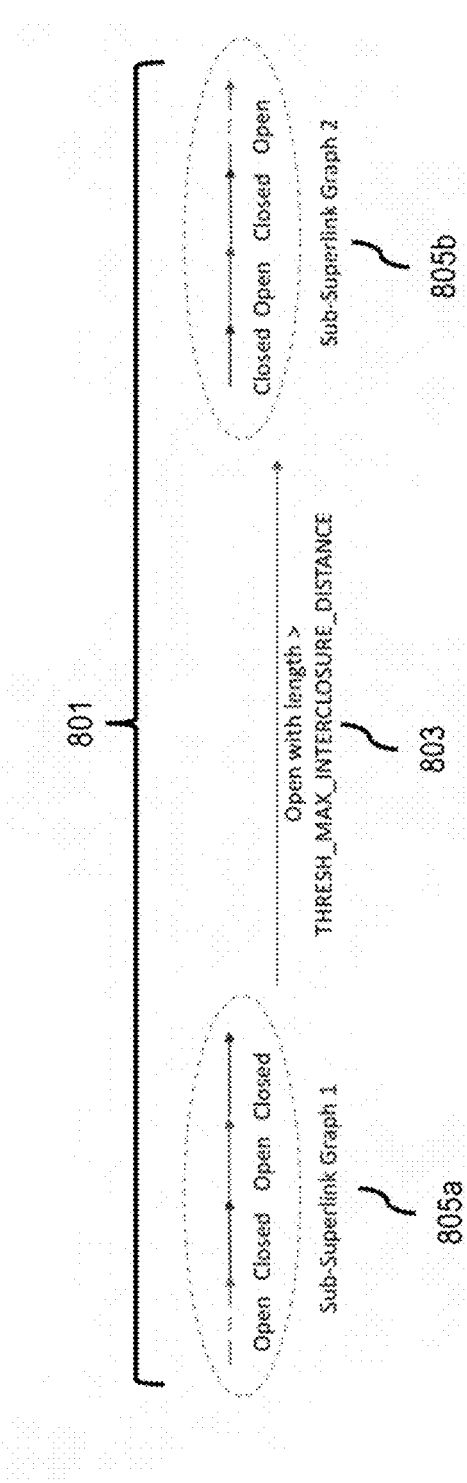

In one embodiment, prior to combining discontinuous road closures, the roadway graph module 301 can go through the roadway graph of interest and break down this graph into subgraphs such that these subgraphs do not contain an open road segment between two closures which is greater than THRESH_MAX_INTERCLOSURE_DISTANCE. FIG. 8A illustrates an example of a large graph 801 with a very long open superlink 803 in the middle. As shown in FIG. 8B, the large graph 801 can be split at the long superlink 803 into smaller subgraphs 805a and 805b. In one embodiment, the subgraphs 805a and 805b can be further split until the resulting subgraphs meet the maximum interclosure distance threshold. In other words, each of the subgraphs 805a and 805b are split so that the subgraphs 805a and 805b do not contain an open road segment that is greater in length than a maximum interclosure distance.

Returning to the process 400, in steps 403 and 405, the scoring module 303 calculates a closure confidence score is calculated for each closed and open segment. As described above, a closure/open segment can consist of one or more superlinks. Therefore, closure confidence score for a closed/open segment can be calculated as follows:

(1) In step 403, for each superlink i of the segment, the scoring module 303 calculates an importance weight $w_{SLi}$, using one or more attributes of the superlink. Examples of some of these attributes are provided below.

(2) In step 405, the scoring module 303 computes the closure confidence score for the whole segment by taking a weighted average of superlink probabilities over each superlink of the segment using the weights $w_{SLi}$.

In one embodiment, the importance weight of a superlink can be determined from one or more attributes of that superlink. Some examples of these attributes include but is not limited to:

Length of the superlink.

Expected volume on that superlink in a given time interval (e.g., historically 7 unique vehicles were expected to pass through the superlink in the past 5 minutes).

Functional class (FC) importance: an importance class assigned to roads which takes values between 1 (most important) and 5 or more (least important). Since lower values indicate more important roads, the importance value due to functional class can be computed as follows:
FC importance=maxFC+1−FC, where maxFC is the maximum FC.
For instance, if FC has a range between 1 and 5, and FC of a superlink is 2, then the FC importance value=5+

1−2=4. If FC is 3, then the corresponding FC importance value=5+1−3=3 and is lower than the importance value of the superlink with FC=2.

Closure status duration: for how long the superlink has been marked as closed or open.

In one embodiment, the scoring module 303 can normalize these attributes for each superlink over the entire segment as follows:

Normalized length (Length_norm)=superlink_length/sum (superlink_length) over all superlinks of the segment;

Normalized expected volume (Volume_norm)=expected_volume/sum(expected_volume) over all superlinks of the segment);

Normalized FC (FC_norm)=functional_class_importance/(maxFC+1)

Normalized closure status duration (Duration norm)=closure_duration/sum(closure_duration) over all superlinks of the segment.

Then, the importance weight of the superlink for the segment it belongs to can be computed as follows:

$$w_{SL} = \frac{w_L \times Length_{norm} + w_V \times Volume_{norm} + w_{FC} \times FC_{norm} + w_D \times Duration_{norm}}{w_L + w_V + w_{FC} + w_D}$$

Once the superlink importance weights for a segment are calculated, closure confidence score of that segment can simply be computed by calculating the weighted average of the closure probabilities of the superlinks of that segment. The weights in this calculation are the superlink importance weights computed above:

$$score = \frac{\sum_i w_{SLi} \times probability_i}{\sum_i w_{SLi}}$$

Figure 9:
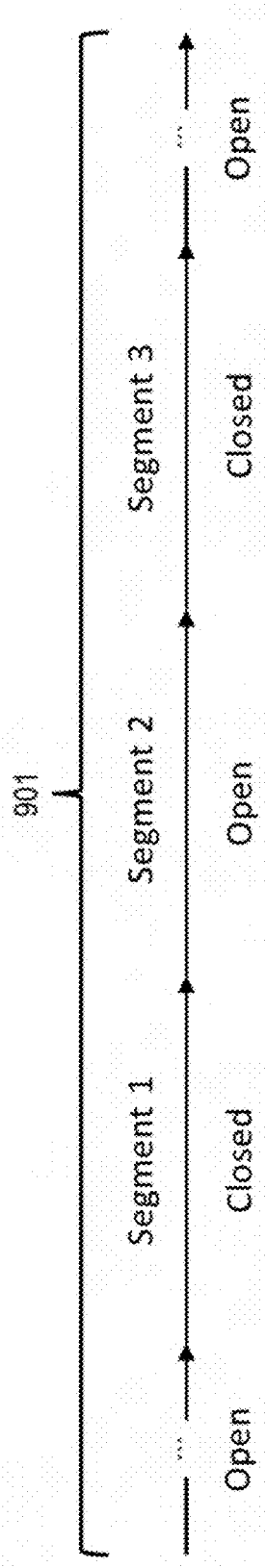

For the rest of the process 400 for combining or correcting road closures, the closure confidence score for each segment in the roadway graph is assumed to be calculated. For example, in step 405, the state correction module 307 can determine to change or not change a road closure state of the one or more open segments, the at least two closed segments, or combination thereof based on the closure confidence score and/or a minimum distance threshold between the at least two closed segments. In one embodiment, the state correction module 307 makes this determination by evaluating various base cases of the discontinuous road closures contained the roadway graph. For example, the general base case 901 comprise two closure segments (e.g., segments 1 and 3) with an open segment (e.g., segment 2) in between, as shown in FIG. 9.

The state correction module 307 analyzes segments 1-3 of based case 901, to determine if the closure state of the road segments 1-3 should be changed. In one embodiment, this decision is driven by how confidently closed or open these three segments are (e.g., based on their closure confidence scores and/or corresponding classifications). In other words, the determination of whether to change or combine road closures depends on these segments being strongly/weakly closed/open. This results, for instance, in eight different scenarios to consider. In all of these scenarios, L is the entire combined length of the segments being evaluated; i.e.:

$L$=Length(Segment 1−Segment 3)

Figure 10:
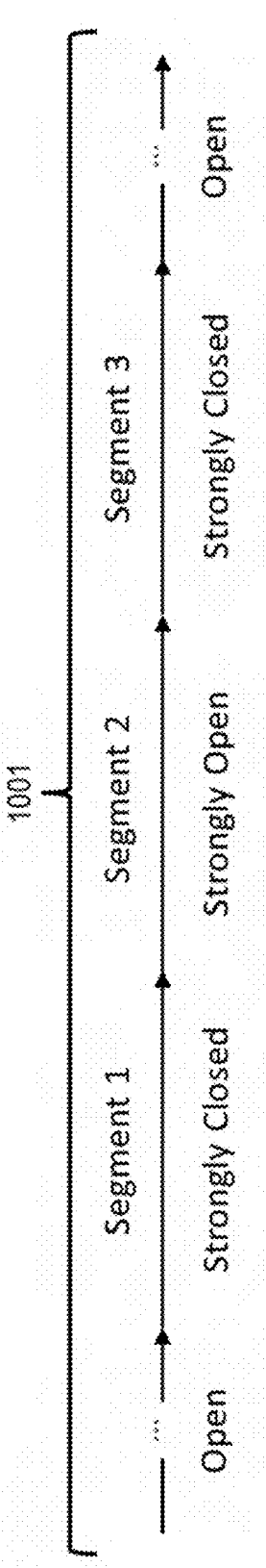

These eight base cases are illustrated in FIGS. 10-17 and discussed below. FIG. 10 illustrates a base case 1001 in which all of the segments 1-3 are either strongly closed or strongly open. To process base case 1001, the state correction module 307 evaluates the segments to modify the status of either Segment 1 or Segment 3 according to the following:

If L>=THRESH_MIN_MULTI_CLOSURE_LENGTH (i.e., a minimum multiple closure length threshold), the state correction module 307 does not change the state of any of the Segments 1 or 3.

Otherwise, the state correction module 307 can impose Rule 1 discussed above, which states that there cannot be two disjoint closure segments within the minimum multiple closure length threshold of each other. Accordingly, the state correction module 307 finds which of the closed segments (Segment 1 or Segment 3) has lower score and open that road segment. In case of Segment 1 and Segment 3 having same scores, pick one of them randomly and open it.

In other words, for base case 1001, the state correction module 307 determines that a unit of the roadway graph includes at least a first segment classified as strongly closed, a second segment classified as strongly open, and a third segment classified as strongly closed. The state correction module 307 then performs at least one of: (1) initiating no change of the road closure state of the unit based on determining that a total link length of the unit is greater than or equal to the minimum distance threshold; and (2) initiating a change of the road closure state of either the first segment or the third segment based on determining that the total link length of the unit is less than the minimum distance threshold and based on the respective closure confidence score of the first segment and the third segment.

Figure 11:
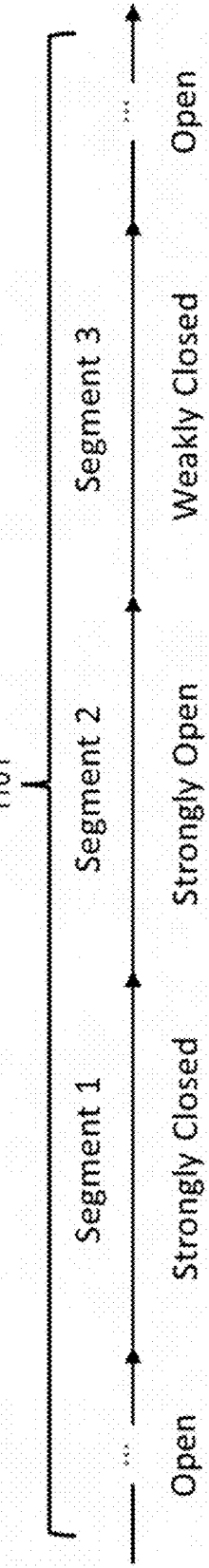

FIG. 11 illustrates a base case 1101 comprising one strongly closed, one strongly open and one weakly closed segment. To process base case 1101, the state correction module 307 evaluates whether to modify the status of Segment 3 according to the following:

If L<THRESH_MIN_MULTI_CLOSURE_LENGTH, keep Segment 1 closed and open Segment 3. This is due to Rule 1 which states that there cannot be two discontinuous closure segments within the minimum multiple closure length threshold of each other.

If L>=THRESH_MIN_MULTI_CLOSURE_LENGTH, then:

If Segment 3 is semi-weakly closed, the state correction module 307 marks Segment 3 as closed.

Otherwise, the state correction module 307 opens Segment 3.

In other words, for base case 1101, the state correction module 307 determines that a unit of the roadway graph includes at least a first segment classified as strongly closed, a second segment classified as strongly open, and a third segment classified as weakly closed. The state correction module 307 then performs at least one of: (1) initiating a change of the road closure state of the third segment to open based on determining that the total link length of the unit is less than the minimum distance threshold; and (2) initiating a change of the road closure state of the third segment to open based on determining that a total link length of the unit is greater than or equal to the minimum distance threshold and based on determining that the third segment is further classified as semi-weakly closed.

FIG. 12 illustrates a base case 1201 comprising one weakly open segment surrounded by two strongly closed segments. To process base case 1201, the state correction module 307 evaluates whether to modify only the status of Segment 2 according to the following:

If L<THRESH_MIN_MULTI_CLOSURE_LENGTH, the state correction module 307 closes Segment 2.
If L>=THRESH_MIN_MULTI_CLOSURE_LENGTH, then:
If Segment 2 is weakly open, the state correction module 307 keeps Segment 2 open.
Otherwise, the state correction module 307 closes Segment 2.

In other words, for base case 1201, the state correction module 307 determines that a unit of the roadway graph includes at least a first segment is classified as strongly closed, a second segment classified as weakly open, and a third segment classified as strongly closed. The state correction module 307 then performs at least one of: (1) initiating a change of the road closure state of the second segment to closed based on determining that the total link length of the unit is less than the minimum distance threshold; and (2) initiating a change of the road closure state of the second segment to closed based on determining that a total link length of the unit is greater than or equal to the minimum distance threshold and based on determining that the second segment is further classified as semi-weakly open.

FIG. 13 illustrates a base case 1301 comprising one strongly and one weakly closed segment with a weakly open segment in the middle. To process base case 1301, the state correction module 307 evaluates the following:

If L<THRESH_MIN_MULTI_CLOSURE_LENGTH, then:
If Segment 3 is semi-weakly closed, the state correction module 307 closes Segment 2.
Otherwise, the state correction module 307 opens Segment 3.
If L>=THRESH_MIN_MULTI_CLOSURE_LENGTH, then:
If Segment 3 is semi-weakly closed, the state correction module 307 keeps Segment 3 closed.
Otherwise, the state correction module 307 marks Segment 3 open.

In other words, for base case 1301, the state correction module 307 determines that a unit of the roadway graph includes at least a first segment is classified as strongly closed, a second segment classified as weakly open, and a third segment classified as weakly closed. The state correction module 307 then performs at least one of: (1) initiating a change of the road closure state of the second segment to closed based on determining that the total link length of the unit is less than the minimum distance threshold and based on determining that the third segment is further classified as semi-weakly closed; (2) initiating a change of the road closure state of the third segment to open based on determining that the total link length of the unit is less than the minimum distance threshold and based on determining that the segment is not further classified as semi-weakly closed; and (3) initiating a change of the road closure state of the third segment to open based on determining that a total link length of the unit is greater than or equal to the minimum distance threshold and based on determining that the third segment is not further classified as semi-weakly closed.

FIG. 14 illustrates a base case 1401 that is a mirror-image of base case 1101 of FIG. 11 above. To process based case 1401, different than based case 1101, the state correction module 307 evaluates whether to modify the status of Segment 1 as follows:

If L<THRESH_MIN_MULTI_CLOSURE_LENGTH, the state correction module 307 keeps Segment 3 closed and opens Segment 1.
If L>=THRESH_MIN_MULTI_CLOSURE_LENGTH, then:
If Segment 1 is semi-weakly closed, the state correction module 307 marks Segment 1 as closed.
Otherwise, the state correction module 307 opens Segment 1.

In other words, for base case 1401, the state correction module 307 determines that a unit of the roadway graph includes at least a first segment is classified as weakly closed, a second segment classified as strongly open, and a third segment classified as strongly closed. The state correction module 307 then performs at least one of: (1) initiating a change of the road closure state of the first segment to open based on determining that the total link length of the unit is less than the minimum distance threshold; and (2) initiating a change of the road closure state of the first segment to open based on determining that a total link length of the unit is greater than or equal to the minimum distance threshold and based on determining that the first segment is not further classified as semi-weakly closed.

Figure 15:
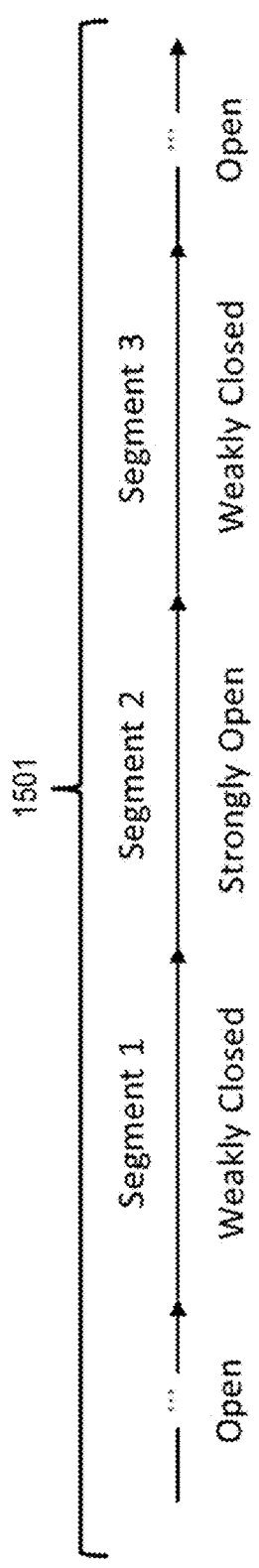

FIG. 15 illustrates a base case 1501 comprising two weakly closed segments surrounding a strongly open segment. To process base case 150, the state correction module 307 evaluates the following:

If both Segment 1 and Segment 3 are semi-weakly closed, the state correction module 307 keeps the one with higher score closed and opens the other segment. In case of equal scores, the state correction module 307 break ties randomly (e.g., randomly selects to open either Segment 1 or Segment 3).
If only one segment is semi-weakly closed, the state correction module 307 keeps that segment closed and opens the other segment.
If neither segment is semi-weakly closed, the state correction module 307 opens both segments.

In other words, for base case 1501, the state correction module 307 determines that a unit of the roadway graph includes at least a first segment is classified as weakly closed, a second segment classified as strongly open, and a third segment classified as weakly closed. The state correction module 307 then performs at least one of: (1) initiating a change of the road closure state of the first segment to open based on determining that the first segment and the third segment are further classified as semi-weakly closed and based on determining that the closure confidence score of the third segment is higher than the first segment; (2) initiating a change of the road closure state of the third segment to open based on determining that the first segment and the third segment are further classified as semi-weakly closed and based on determining that the closure confidence score of the first segment is higher than the third segment; (3) randomly initiating a change of the road closure state of either the first segment or the third segment to open based on determining that the first segment and the third segment are further classified as semi-weakly closed and based on determining that the closure confidence score of the first segment is equal to the third segment; (4) initiating a change of the road closure state of the first segment to open based on determining that the third segment is further classified as semi-weakly closed; (5) initiating a change of the road closure state of the third segment to open based on determining that the first segment is further classified as semi-weakly closed; and (6) initiating a change of the road closure state of both the first segment and the third segment to open based on determining neither the first segment or the third segment is further classified as semi-weakly closed.

Figure 16:
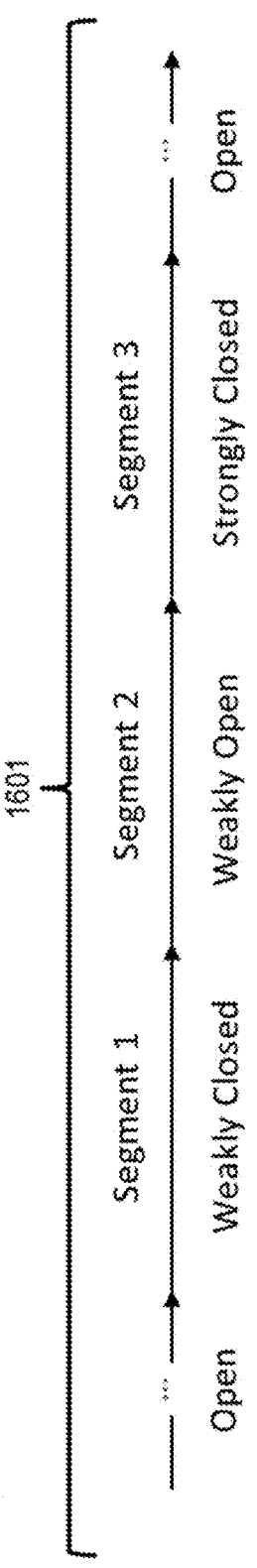

FIG. 16 illustrates a base case 1601 that is the mirror scenario of base case 1401 of FIG. 14. To process base case 1601, the state correction module 307 evaluates the following:

If L<THRESH_MIN_MULTI_CLOSURE_LENGTH,
    If Segment 1 is semi-weakly closed, the state correction module 307 closes Segment 2.
    Otherwise, the state correction module 307 opens Segment 1.
If L>=THRESH_MIN_MULTI_CLOSURE_LENGTH,
    If Segment 1 is semi-weakly closed, the state correction module 307 keeps Segment 1 closed.
    Otherwise, the state correction module 307 marks Segment 1 open.

In other words, for base case 1501, the state correction module 307 determines that a unit of the roadway graph includes at least a first segment is classified as weakly closed, a second segment classified as weakly open, and a third segment classified as strongly closed. The state correction module 307 then performs at least one of: (1) initiating a change of the road closure state of the second segment to closed based on determining that the total link length of the unit is less than the minimum distance threshold and based on determining that the first segment is further classified as semi-weakly closed; (2) initiating a change of the road closure state of the first segment to open based on determining that the total link length of the unit is less than the minimum distance threshold and based on determining that the first segment is not further classified as semi-weakly closed; and (3) initiating a change of the road closure state of the first segment to open based on determining that a total link length of the unit is greater than or equal to the minimum distance threshold and based on determining that the first segment is not further classified as semi-weakly closed.

Figure 17:
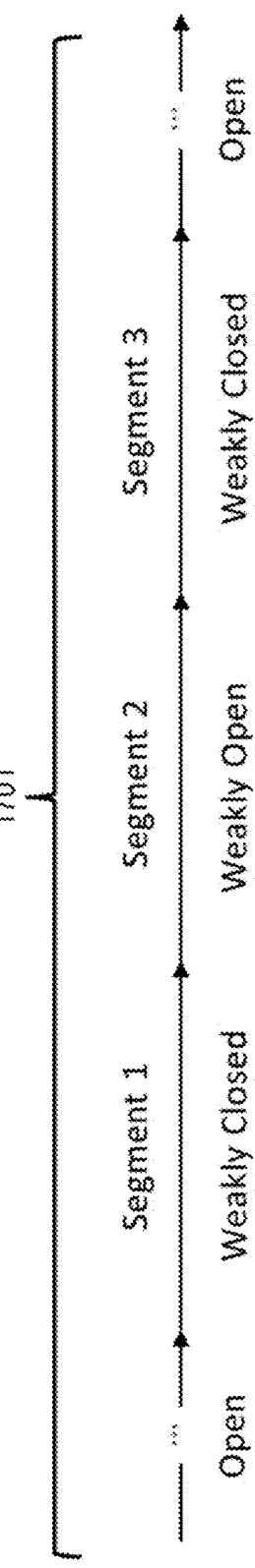

FIG. 17 illustrates a base case 1701 comprising two weakly closed segments surrounding a weakly opened segment. To process base case 1701, the state correction module 307 can perform a similar evaluation as for base case 1501 of FIG. 15 as follows:

If both Segment 1 and Segment 3 are semi-weakly closed, the state correction module 307 keeps the one with higher score closed and opens the other segment. In case of equal scores, the state correction module 307 break ties randomly (e.g., randomly selects to open either Segment 1 or Segment 3).
If only one segment is semi-weakly closed, the state correction module 307 keeps that segment closed and opens the other segment.
If neither segment is semi-weakly closed, the state correction module 307 opens both segments.

The base cases of FIGS. 10-17 above are described with respect to a smallest unit or sequence of segments of a roadway graph that can form a discontinuous road closure (e.g., two closed segments separated by an open segment). In case of more complex setups with multiple closed and open segments, a sliding window of three road segments can be applied to the complex road, where the content of the window matches one of the base cases 1001-1701. In one embodiment, the first window covers the first closed segment, followed by the first open segment and then the second closed segment. The state correction module 307 then makes a decision on road closure states of the segments within the bounds of the window by following the evaluation processes described in the matching base case above.

Figure 18A:
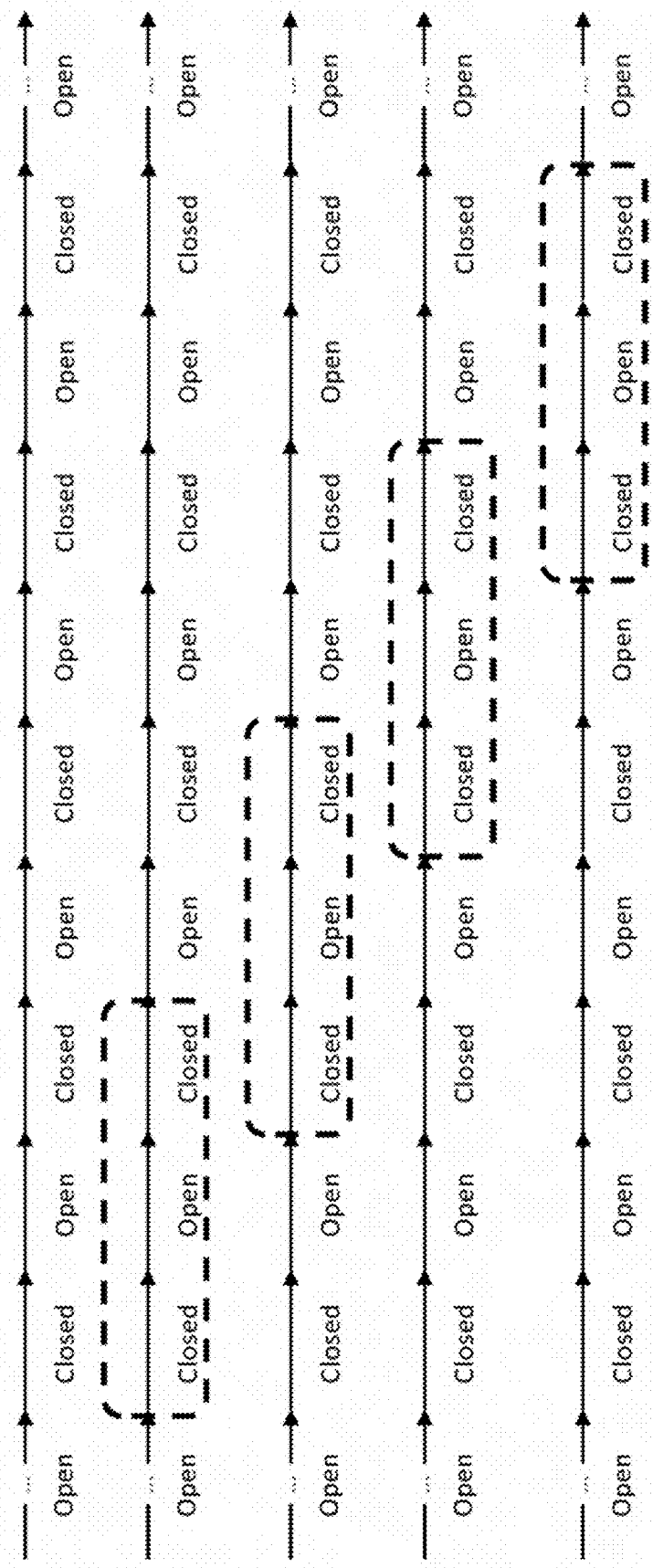
FIGS. 18A and 18B are diagram illustrating examples of combining road closures over a more complex road closure area using a sliding window, according to one embodiment.

Then, the window slides such that its starting point is the second closure. The new window covers the second and third closures with the second open segment in between. The state correction module 307 again applies the evaluation processes specified by the matching base case for this window. As illustrated in the sliding example 1801 of FIG. 18A, the window slides iteratively over each three-segment unit of the roadway graph from a specified beginning segment to an end segment. In one embodiment, as the sliding window moves in the direction of traffic, the state correction module 307 evaluates road segments and records their new states. However, in one embodiment, these states do not become effective until the window reaches the final or specified end closure segment. Once the window fully passes through the entire closure area, the states of the road segments are updated based on the outcome of the base cases evaluated in each window. Finally, a closure confidence score for each of the new segments is recalculated using the superlinks that belong to each road segment.

Figure 18B:
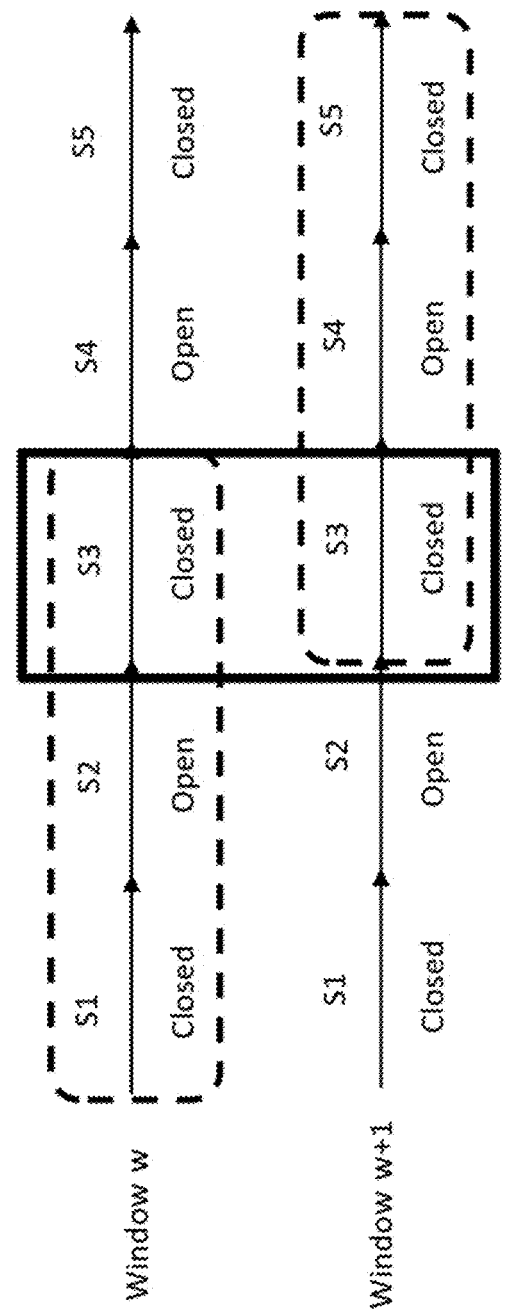

It should be noted that two consecutive windows will have a common road segment, e.g., the last segment in window w is the same as the segment in window w+1 (e.g., as shown in the window example 1811 of FIG. 18B. The common road segment, S3, is evaluated in two different windows. Because of this, there is a possibility that two consecutive windows can decide on a different status on a common segment. In one embodiment, to resolve any potential inconsistency in state determination, if only one window decides the road segment shall be open, the segment is marked as open; or alternatively, if only one window decides the road segment shall be closed, the segment is marked as closed.

This process above is repeated, where a window slides from the beginning of the closure area until the end, evaluating each road segment using the new closure confidence scores. In one embodiment, the state correction module 307 stops either after a maximum number of iterations or once the road segments between two iterations have the same closure state.

An embodiment of the sliding window process is summarized below:

(1) The state correction module 307 applies a sliding window over three consecutive road segments, such that the first and last segments are closures, with the middle segment being open.
(2) The state correction module 307 evaluates the road segments in each window, matching them to one of the 8 possible base cases. Record the decision for each road segment within the window.
(3) The state correction module 307 repeats steps 1-2 until the end of the closure region is reached.
(4) The state correction module 307 updates the closure status of each segment based on step 2. For road segments with two different closure decisions, the state correction module 307 marks the segment open if at least one of the decisions is open. In one embodiment, the state correction module 307 marks the road closed if both decisions state closure.
(5) The state correction module 307 recalculates closure confidence scores for all segments whose status have flipped (e.g., from closure to open or vice versa).
(6) The state correction module 307 repeats steps 1-5 until a maximum number of iterations are reached or until the closure status of road segments do not change between two iterations.

In one embodiment, after performing inconsistency resolution on road closure data, the mapping platform 111 can output the processed data to the road closure data layer 119 of the geographic database 109 or equivalent data. The mapping platform 111 can then provide access to the closure data layer 119 to providing mapping services, navigation services, location-based services, user interfaces, and/or any other service using the resolved road closure data.

Returning to FIG. 1, in one embodiment, the mapping platform 111 has connectivity over a communication network 117 to other components of the system 100 including but not limited to road closure reports 101, services platform 103, services 105, content providers 107, geographic database 109, and/or vehicles 113 (e.g., probes). By way of example, the services 105 may also be other third-party services and include traffic incident services (e.g., to report road closures), mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 103 uses the output (e.g. physical divider predictions) of the mapping platform 111 to provide services such as navigation, mapping, other location-based services, etc.

In one embodiment, the mapping platform 111 may be a platform with multiple interconnected components. The mapping platform 111 may include multiple servers, intelligent networking devices, computing devices, components and corresponding software for providing parametric representations of lane lines. In addition, it is noted that the mapping platform 111 may be a separate entity of the system 100, a part of the one or more services 105, a part of the services platform 103, or included within the vehicle 113.

In one embodiment, content providers 107a-107m (collectively referred to as content providers 107) may provide content or data (e.g., including geographic data, parametric representations of mapped features, etc.) to the geographic database 109, the mapping platform 111, the services platform 103, the services 105, and the vehicle 113. The content provided may be any type of content, such as traffic incident content (e.g., road closure reports), map content, textual content, audio content, video content, image content, etc. In one embodiment, the content providers 107 may provide content that may aid in the detecting and classifying of road closures or other traffic incidents. In one embodiment, the content providers 107 may also store content associated with the geographic database 109, mapping platform 111, services platform 103, services 105, and/or vehicle 113. In another embodiment, the content providers 107 may manage access to a central repository of data, and offer a consistent, standard interface to data, such as a repository of the geographic database 109.

In one embodiment, the vehicles 113, for instance, are part of a probe-based system for collecting probe data for detecting traffic incidents and/or measuring traffic conditions in a road network. In one embodiment, each vehicle 113 is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 113 may include sensors 115 for reporting measuring and/or reporting attributes. The attributes can also be any attribute normally collected by an on-board diagnostic (OBD) system of the vehicle, and available through an interface to the OBD system (e.g., OBD II interface or other similar interface). In one embodiment, this data allows the system 100 to calculate or construct vehicle paths of a vehicle 113 over a stretch of road (e.g., over a closure link graph).

The probe points can be reported from the vehicles 113 in real-time, in batches, continuously, or at any other frequency requested by the system 100 over, for instance, the communication network 117 for processing by the mapping platform 111. The probe points also can be mapped to specific road links stored in the geographic database 109. In one embodiment, the system 100 can generate probe traces (e.g., vehicle paths or trajectories) from the probe points for an individual probe so that the probe traces represent a travel trajectory or vehicle path of the probe through the road network.

In one embodiment, the vehicle 113 is configured with various sensors 115 for generating or collecting vehicular sensor data, related geographic/map data, etc. In one embodiment, the sensed data represent sensor data associated with a geographic location or coordinates at which the sensor data was collected. In this way, the sensor data can act as observation data that can be separated into location-aware training and evaluation datasets according to their data collection locations as well as used for evaluating road closure reports according to the embodiments described herein. By way of example, the sensors may include a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of sensors of the vehicle 113 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle 113 may detect the relative distance of the vehicle from a physical divider, a lane or roadway, the presence of other vehicles, pedestrians, traffic lights, potholes and any other objects, or a combination thereof. In one scenario, the sensors may detect weather data, traffic information, or a combination thereof. In one embodiment, the vehicle 113 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 117 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 111, services platform 103, services 105, vehicle 113, and/or content providers 107 communicate with each other and other components of the system 100 using well known, new or still developing protocols. In this context, a protocol includes a set of rules defining how the network nodes within the communication network 117 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 19:
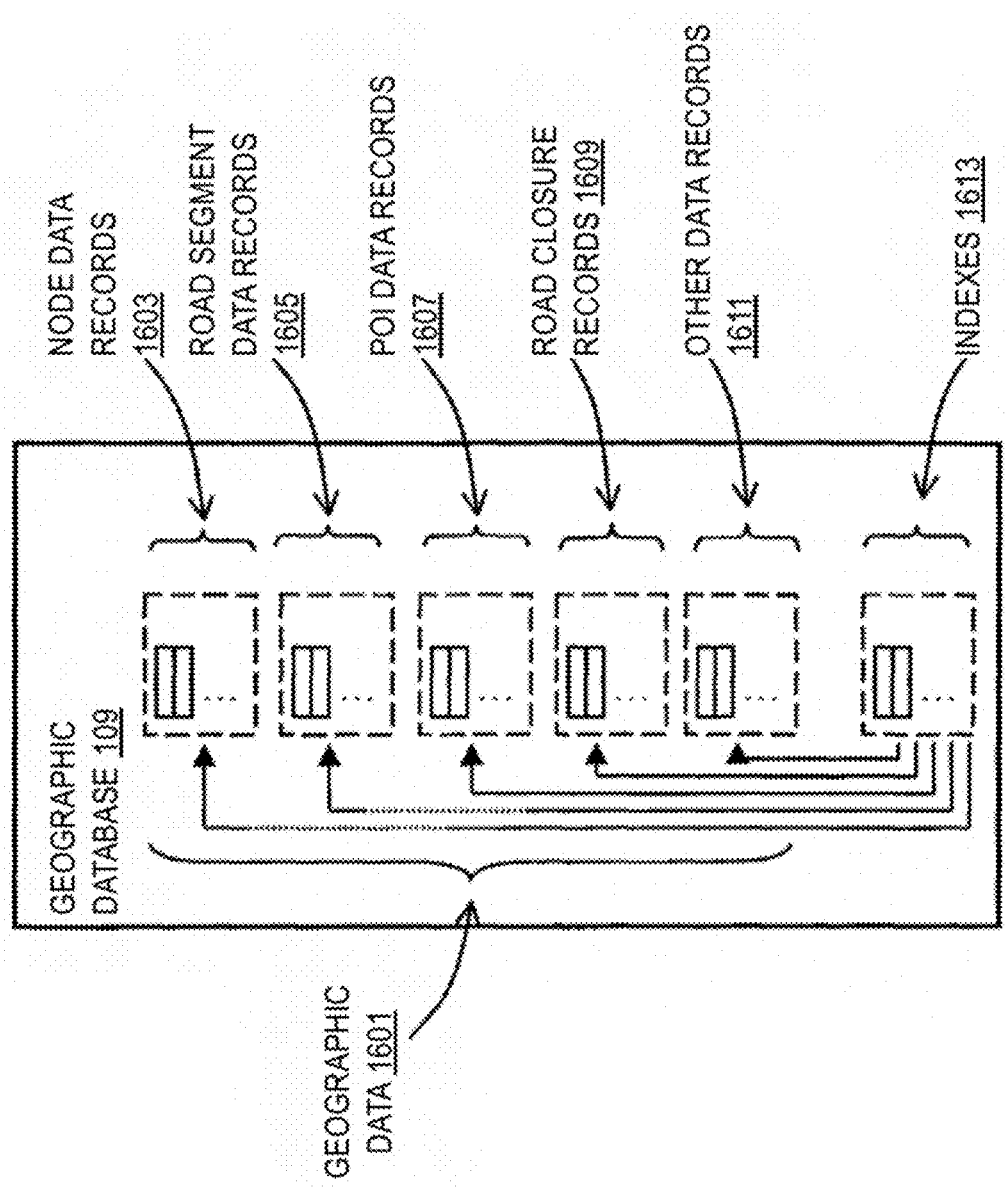
FIG. 19 is a diagram of a geographic database, according to one embodiment.

FIG. 19 is a diagram of a geographic database, according to one embodiment. In one embodiment, the geographic database 109 includes geographic data 1901 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 109.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 109 follows certain conventions. For example, links do not cross themselves and do not cross each other except at a node. Also, there are no duplicated shape points, nodes, or links. Two links that connect each other have a common node. In the geographic database 109, overlapping geographic features are represented by overlapping polygons. When polygons overlap, the boundary of one polygon crosses the boundary of the other polygon. In the geographic database 109, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 109 includes node data records 1903, road segment or link data records 1905, POI data records 1907, road closure data records 1909, other records 1911, and indexes 1913, for example. More, fewer or different data records can be provided. In one embodiment, additional data records (not shown) can include cartographic ("carto") data records, routing data, and maneuver data. In one embodiment, the indexes 1913 may improve the speed of data retrieval operations in the geographic database 109. In one embodiment, the indexes 1913 may be used to quickly locate data without having to search every row in the geographic database 109 every time it is accessed. For example, in one embodiment, the indexes 1913 can be a spatial index of the polygon points associated with stored feature polygons.

In exemplary embodiments, the road segment data records 1905 are links or segments representing roads, streets, or paths, as can be used in the calculated route or recorded route information for determination of one or more personalized routes. The node data records 1903 are endpoints corresponding to the respective links or segments of the road segment data records 1905. The road link data records 1905 and the node data records 1903 represent a road network, such as used by vehicles, cars, and/or other entities. Alternatively, the geographic database 109 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109 can include data about the POIs and their respective locations in the POI data records 1907. The geographic database 109 can also include data about places, such as cities, towns, or other communities, and other geographic features, such as bodies of water, mountain ranges, etc. Such place or feature data can be part of the POI data records 1907 or can be associated with POIs or POI data records 1907 (such as a data point used for displaying or representing a position of a city).

In one embodiment, the geographic database 109 includes the road closure data records 1909 for storing inconsistency-resolved road closure data, predicted road closure reports, road closure evaluations, road closure link graphs, associated probe data/vehicle paths, extracted features derived from the probe data, and/or any other related data. The road closure data records 1909 comprise of the road closure data layer 119 that store the automatically generated road closure classifications generated according to the various embodiments described herein. The road closure data layer 119 can be provided to other system components or end users to provided related mapping, navigation, and/or other location-based services. In one embodiment, the road closure data records 1909 can be associated with segments of a road link (as opposed to an entire link). It is noted that the segmentation of the road for the purposes of physical divider prediction can be different than the road link structure of the geographic database 109. In other words, the segments can further subdivide the links of the geographic database 109 into smaller segments (e.g., of uniform lengths such as 5-meters). In this way, road closures or other traffic incidents can be predicted and represented at a level of granularity that is independent of the granularity or at which the actual road or road network is represented in the geographic database 109. In one embodiment, the road closure data records 1909 can be associated with one or more of the node records 1903, road segment or link records 1905, and/or POI data records 1907; or portions thereof (e.g., smaller or different segments than indicated in the road segment records 1905) to provide situational awareness to drivers and provide for safer autonomous operation of vehicles.

In one embodiment, the geographic database 109 can be maintained by the content provider 107 in association with the services platform 103 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ field personnel to travel by vehicle along roads throughout the geographic region to observe features (e.g., road closures or other traffic incidents, etc.) and/or record information about them, for example. Also, remote sensing, such as aerial or satellite photography, can be used.

In one embodiment, the geographic database 109 include high resolution or high definition (HD) mapping data that provide centimeter-level or better accuracy of map features. For example, the geographic database 109 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the geographic database 109 is stored as a hierarchical or multilevel tile-based projection or structure. More specifically, in one embodiment, the geographic database 109 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has $2(n+1)$ cells. Accordingly, any tile of the level (n) has a geographic area of $A/2(n+1)$ where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 109 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 113, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for combining discontinuous road closures detected in a network may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 20:
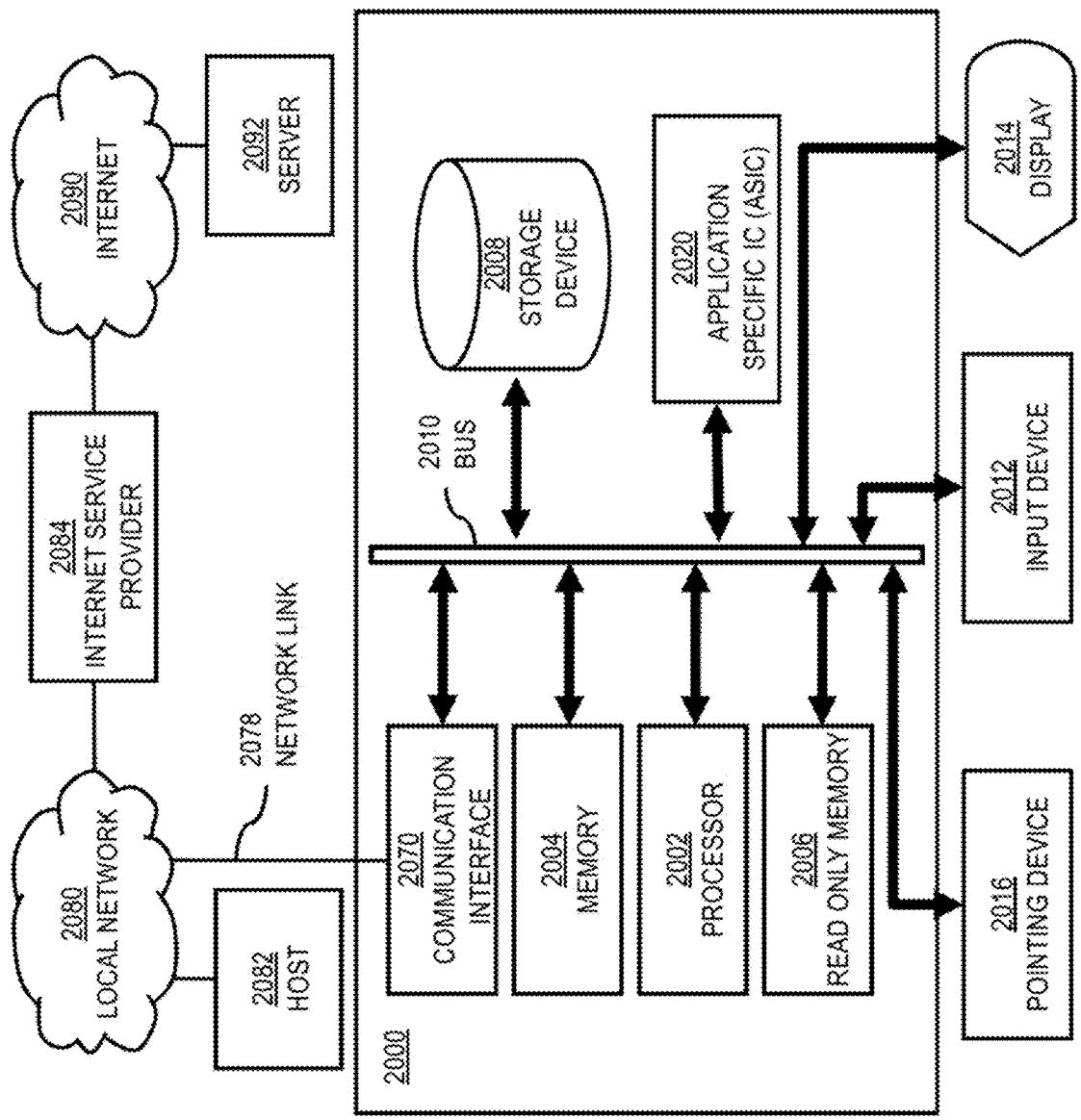
FIG. 20 is a diagram of hardware that can be used to implement an embodiment.

FIG. 20 illustrates a computer system 2000 upon which an embodiment of the invention may be implemented. Computer system 2000 is programmed (e.g., via computer program code or instructions) to combine discontinuous road closures detected in a network as described herein and includes a communication mechanism such as a bus 2010 for passing information between other internal and external components of the computer system 2000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 2010 includes one or more parallel conductors of information so that information is transferred quickly among devices coupled to the bus 2010. One or more processors 2002 for processing information are coupled with the bus 2010.

A processor 2002 performs a set of operations on information as specified by computer program code related to combine discontinuous road closures detected in a network. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 2010 and placing information on the bus 2010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 2002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 2000 also includes a memory 2004 coupled to bus 2010. The memory 2004, such as a random access memory (RAM) or other dynamic storage device, stores information including processor instructions for combining discontinuous road closures detected in a network. Dynamic memory allows information stored therein to be changed by the computer system 2000. RAM allows a unit of information stored at a location called a memory address to be stored and retrieved independently of information at neighboring addresses. The memory 2004 is also used by the processor 2002 to store temporary values during execution of processor instructions. The computer system 2000 also includes a read only memory (ROM) 2006 or other static storage device coupled to the bus 2010 for storing static information, including instructions, that is not changed by the computer system 2000. Some memory is composed of volatile storage that loses the information stored thereon when power is lost. Also coupled to bus 2010 is a non-volatile (persistent) storage device 2008, such as a magnetic disk, optical disk or flash card, for storing information, including instructions, that persists even when the computer system 2000 is turned off or otherwise loses power.

Information, including instructions for combining discontinuous road closures detected in a network, is provided to the bus 2010 for use by the processor from an external input device 2012, such as a keyboard containing alphanumeric keys operated by a human user, or a sensor. A sensor detects conditions in its vicinity and transforms those detections into physical expression compatible with the measurable phenomenon used to represent information in computer system 2000. Other external devices coupled to bus 2010, used primarily for interacting with humans, include a display device 2014, such as a cathode ray tube (CRT) or a liquid crystal display (LCD), or plasma screen or printer for presenting text or images, and a pointing device 2016, such as a mouse or a trackball or cursor direction keys, or motion sensor, for controlling a position of a small cursor image presented on the display 2014 and issuing commands associated with graphical elements presented on the display 2014. In some embodiments, for example, in embodiments in which the computer system 2000 performs all functions automatically without human input, one or more of external input device 2012, display device 2014 and pointing device 2016 is omitted.

In the illustrated embodiment, special purpose hardware, such as an application specific integrated circuit (ASIC) 2020, is coupled to bus 2010. The special purpose hardware is configured to perform operations not performed by processor 2002 quickly enough for special purposes. Examples of application specific ICs include graphics accelerator cards for generating images for display 2014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 2000 also includes one or more instances of a communications interface 2070 coupled to bus 2010. Communication interface 2070 provides a one-way or two-way communication coupling to a variety of external devices that operate with their own processors, such as printers, scanners and external disks. In general the coupling is with a network link 2078 that is connected to a local network 2080 to which a variety of external devices with their own processors are connected. For example, communication interface 2070 may be a parallel port or a serial port or a universal serial bus (USB) port on a personal computer. In some embodiments, communications interface 2070 is an integrated services digital network (ISDN) card or a digital subscriber line (DSL) card or a telephone modem that provides an information communication connection to a corresponding type of telephone line. In some embodiments, a communication interface 2070 is a cable modem that converts signals on bus 2010 into signals for a communication connection over a coaxial cable or into optical signals for a communication connection over a fiber optic cable. As another example, communications interface 2070 may be a local area network (LAN) card to provide a data communication connection to a compatible LAN, such as Ethernet. Wireless links may also be implemented. For wireless links, the communications interface 2070 sends or receives or both sends and receives electrical, acoustic or electromagnetic signals, including infrared and optical signals, that carry information streams, such as digital data. For example, in wireless handheld devices, such as mobile telephones like cell phones, the communications interface 2070 includes a radio band electromagnetic transmitter and receiver called a radio transceiver. In certain embodiments, the communications interface 2070 enables connection to the communication network 117 for combining discontinuous road closures detected in a network.

The term computer-readable medium is used herein to refer to any medium that participates in providing information to processor 2002, including instructions for execution. Such a medium may take many forms, including, but not limited to, non-volatile media, volatile media and transmission media. Non-volatile media include, for example, optical or magnetic disks, such as storage device 2008. Volatile media include, for example, dynamic memory 2004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 21 illustrates a chip set 2100 upon which an embodiment of the invention may be implemented. Chip set 2100 is programmed to combine discontinuous road closures detected in a network as described herein and includes, for instance, the processor and memory components described with respect to FIG. 20 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 2100 includes a communication mechanism such as a bus 2101 for passing information among the components of the chip set 2100. A processor 2103 has connectivity to the bus 2101 to execute instructions and process information stored in, for example, a memory 2105. The processor 2103 may include one or more processing cores with each core configured to perform independently. A multi-core processor enables multiprocessing within a single physical package. Examples of a multi-core processor include two, four, eight, or greater numbers of processing cores. Alternatively or in addition, the processor 2103 may include one or more microprocessors configured in tandem via the bus 2101 to enable independent execution of instructions, pipelining, and multithreading. The processor 2103 may also be accompanied with one or more specialized components to perform certain processing functions and tasks such as one or more digital signal processors (DSP) 2107, or one or more application-specific integrated circuits (ASIC) 2109. A DSP 2107 typically is configured to process real-world signals (e.g., sound) in real time independently of the processor 2103. Similarly, an ASIC 2109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 2103 and accompanying components have connectivity to the memory 2105 via the bus 2101. The memory 2105 includes both dynamic memory (e.g., RAM, magnetic disk, writable optical disk, etc.) and static memory (e.g., ROM, CD-ROM, etc.) for storing executable instructions that when executed perform the inventive steps described herein to combine discontinuous road closures detected in a network. The memory 2105 also stores the data associated with or generated by the execution of the inventive steps.

Figure 22:
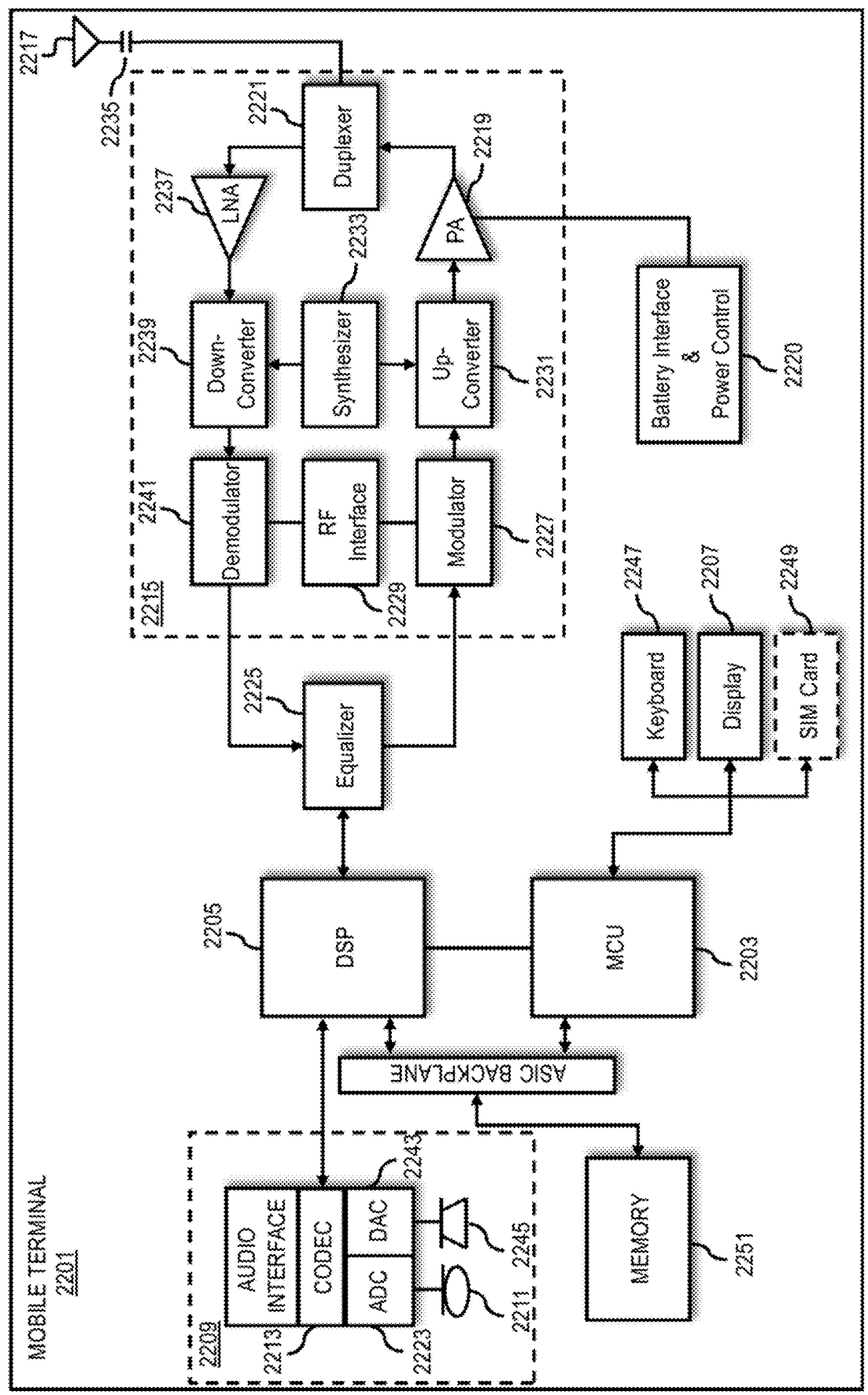
FIG. 22 is a diagram of a mobile terminal (e.g., handset or vehicle or part thereof) that can be used to implement an embodiment.

FIG. 22 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 2203, a Digital Signal Processor (DSP) 2205, and a receiver/transmitter unit including a microphone gain control unit and a speaker gain control unit. A main display unit 2207 provides a display to the user in support of various applications and mobile station functions that offer automatic contact matching. An audio function circuitry 2209 includes a microphone 2211 and microphone amplifier that amplifies the speech signal output from the microphone 2211. The amplified speech signal output from the microphone 2211 is fed to a coder/decoder (CODEC) 2213.

A radio section 2215 amplifies power and converts frequency in order to communicate with a base station, which is included in a mobile communication system, via antenna 2217. The power amplifier (PA) 2219 and the transmitter/modulation circuitry are operationally responsive to the MCU 2203, with an output from the PA 2219 coupled to the duplexer 2221 or circulator or antenna switch, as known in the art. The PA 2219 also couples to a battery interface and power control unit 2220.

In use, a user of mobile station 2201 speaks into the microphone 2211 and his or her voice along with any detected background noise is converted into an analog voltage. The analog voltage is then converted into a digital signal through the Analog to Digital Converter (ADC) 2223. The control unit 2203 routes the digital signal into the DSP 2205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 2225 for compensation of any frequency-dependent impairments that occur during transmission though the air such as phase and amplitude distortion. After equalizing the bit stream, the modulator 2227 combines the signal with a RF signal generated in the RF interface 2229. The modulator 2227 generates a sine wave by way of frequency or phase modulation. In order to prepare the signal for transmission, an up-converter 2231 combines the sine wave output from the modulator 2227 with another sine wave generated by a synthesizer 2233 to achieve the desired frequency of transmission. The signal is then sent through a PA 2219 to increase the signal to an appropriate power level. In practical systems, the PA 2219 acts as a variable gain amplifier whose gain is controlled by the DSP 2205 from information received from a network base station. The signal is then filtered within the duplexer 2221 and optionally sent to an antenna coupler 2235 to match impedances to provide maximum power transfer. Finally, the signal is transmitted via antenna 2217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 2201 are received via antenna 2217 and immediately amplified by a low noise amplifier (LNA) 2237. A down-converter 2239 lowers the carrier frequency while the demodulator 2241 strips away the RF leaving only a digital bit stream. The signal then goes through the equalizer 2225 and is processed by the DSP 2205. A Digital to Analog Converter (DAC) 2243 converts the signal and the resulting output is transmitted to the user through the speaker 2245, all under control of a Main Control Unit (MCU) 2203—which can be implemented as a Central Processing Unit (CPU) (not shown).

The MCU 2203 receives various signals including input signals from the keyboard 2247. The keyboard 2247 and/or the MCU 2203 in combination with other user input components (e.g., the microphone 2211) comprise a user interface circuitry for managing user input. The MCU 2203 runs a user interface software to facilitate user control of at least some functions of the mobile station 2201 to combine discontinuous road closures detected in a network. The MCU 2203 also delivers a display command and a switch command to the display 2207 and to the speech output switching controller, respectively. Further, the MCU 2203 exchanges information with the DSP 2205 and can access an optionally incorporated SIM card 2249 and a memory 2251. In addition, the MCU 2203 executes various control functions required of the station. The DSP 2205 may, depending upon the implementation, perform any of a variety of conventional digital processing functions on the voice signals. Additionally, DSP 2205 determines the background noise level of the local environment from the signals detected by microphone 2211 and sets the gain of microphone 2211 to a level selected to compensate for the natural tendency of the user of the mobile station 2201.

The CODEC 2213 includes the ADC 2223 and DAC 2243. The memory 2251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 2251 may be, but not limited to, a single memory, CD, DVD, ROM, RAM, EEPROM, optical storage, or any other non-volatile or non-transitory storage medium capable of storing digital data.

An optionally incorporated SIM card 2249 carries, for instance, important information, such as the cellular phone number, the carrier supplying service, subscription details, and security information. The SIM card 2249 serves primarily to identify the mobile station 2201 on a radio network.

The card 2249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for combining discontinuous road closures detected in a road network comprising:
    retrieving a roadway graph including one or more open segments and at least two closed segments, wherein the at least two closed segments are discontinuous;
    computing an importance weight for a plurality of road links of the one or more open segments and the at least two closed segments, wherein the importance weight is based on one or more attributes of the plurality of road links;
    computing a closure confidence score for the one or more open segments, the at least two closed segments, or a combination thereof based on the importance weight and a link closure confidence score for each of the plurality of links; and
    changing or not changing a road closure state of the one or more open segments, the at least two closed segments, or a combination thereof based on the closure confidence score and a minimum distance threshold between the at least two closed segments.

2. The method of claim 1, further comprising:
    performing a classification of the one or more open segments, the one or more closed segments, or a combination thereof as strongly closed, weakly closed, semi-weakly closed, strongly open, weakly open, semi-weakly open, or a combination thereof based on the closure confidence score,
    wherein semi-weakly closed is a subclassification of weakly closed and semi-weakly open is a subclassification of weakly open; and
    wherein the road closure state is changed or not changed based at least in part on the classification.

3. The method of claim 2, further comprising:
    determining that a unit of the roadway graph includes at least a first segment classified as strongly closed, a second segment classified as strongly open, and a third segment classified as strongly closed; and
    performing at least one of:
        initiating no change of the road closure state of the unit based on determining that a total link length of the unit is greater than or equal to the minimum distance threshold; and
        initiating a change of the road closure state of either the first segment or the third segment based on determining that the total link length of the unit is less than the minimum distance threshold and based on the respective closure confidence score of the first segment and the third segment.

4. The method of claim 2, further comprising:
    determining that a unit of the roadway graph includes at least a first segment classified as strongly closed, a second segment classified as strongly open, and a third segment classified as weakly closed; and
    performing at least one of:
        initiating a change of the road closure state of the third segment to open based on determining that the total link length of the unit is less than the minimum distance threshold; and
        initiating a change of the road closure state of the third segment to open based on determining that a total link length of the unit is greater than or equal to the minimum distance threshold and based on determining that the third segment is further classified as semi-weakly closed.

5. The method of claim 2, further comprising:
    determining that a unit of the roadway graph includes at least a first segment classified as strongly closed, a second segment classified as weakly open, and a third segment classified as strongly closed; and
    performing at least one of:
        initiating a change of the road closure state of the second segment to closed based on determining that the total link length of the unit is less than the minimum distance threshold; and
        initiating a change of the road closure state of the second segment to closed based on determining that a total link length of the unit is greater than or equal to the minimum distance threshold and based on determining that the second segment is further classified as semi-weakly open.

6. The method of claim 2, further comprising:
    determining that a unit of the roadway graph includes at least a first segment classified as strongly closed, a second segment classified as weakly open, and a third segment classified as weakly closed; and
    performing at least one of:
        initiating a change of the road closure state of the second segment to closed based on determining that the total link length of the unit is less than the minimum distance threshold and based on determining that the third segment is further classified as semi-weakly closed;
        initiating a change of the road closure state of the third segment to open based on determining that the total link length of the unit is less than the minimum distance threshold and based on determining that the segment is not further classified as semi-weakly closed; and
        initiating a change of the road closure state of the third segment to open based on determining that a total link length of the unit is greater than or equal to the minimum distance threshold and based on determining that the third segment is not further classified as semi-weakly closed.

7. The method of claim 2, further comprising:
    determining that a unit of the roadway graph includes at least a first segment classified as weakly closed, a second segment classified as strongly open, and a third segment classified as strongly closed;
    performing at least one of:
        initiating a change of the road closure state of the first segment to open based on determining that the total link length of the unit is less than the minimum distance threshold; and
        initiating a change of the road closure state of the first segment to open based on determining that a total link length of the unit is greater than or equal to the minimum distance threshold and based on determining that the first segment is not further classified as semi-weakly closed.

8. The method of claim 2, further comprising:
  determining that a unit of the roadway graph includes at least a first segment classified as weakly closed, a second segment classified as strongly open, and a third segment classified as weakly closed; and
  performing at least one of:
    initiating a change of the road closure state of the first segment to open based on determining that the first segment and the third segment are further classified as semi-weakly closed and based on determining that the closure confidence score of the third segment is higher than the first segment;
    initiating a change of the road closure state of the third segment to open based on determining that the first segment and the third segment are further classified as semi-weakly closed and based on determining that the closure confidence score of the first segment is higher than the third segment;
    randomly initiating a change of the road closure state of either the first segment or the third segment to open based on determining that the first segment and the third segment are further classified as semi-weakly closed and based on determining that the closure confidence score of the first segment is equal to the third segment;
    initiating a change of the road closure state of the first segment to open based on determining that the third segment is further classified as semi-weakly closed;
    initiating a change of the road closure state of the third segment to open based on determining that the first segment is further classified as semi-weakly closed; and
    initiating a change of the road closure state of both the first segment and the third segment to open based on determining neither the first segment nor the third segment is further classified as semi-weakly closed.

9. The method of claim 2, further comprising:
  determining that a unit of the roadway graph includes at least a first segment classified as weakly closed, a second segment classified as weakly open, and a third segment classified as strongly closed;
  performing at least one of:
    initiating a change of the road closure state of the second segment to closed based on determining that the total link length of the unit is less than the minimum distance threshold and based on determining that the first segment is further classified as semi-weakly closed;
    initiating a change of the road closure state of the first segment to open based on determining that the total link length of the unit is less than the minimum distance threshold and based on determining that the first segment is not further classified as semi-weakly closed; and
    initiating a change of the road closure state of the first segment to open based on determining that a total link length of the unit is greater than or equal to the minimum distance threshold and based on determining that the first segment is not further classified as semi-weakly closed.

10. The method of claim 2, further comprising:
  determining that a unit of the roadway graph includes at least a first segment classified as weakly closed, a second segment classified as weakly open, and a third segment classified as weakly closed; and
  performing at least one of:
    initiating a change of the road closure state of the first segment to open based on determining that the first segment and the third segment are further classified as semi-weakly closed and based on determining that the closure confidence score of the third segment is higher than the first segment;
    initiating a change of the road closure state of the third segment to open based on determining that the first segment and the third segment are further classified as semi-weakly closed and based on determining that the closure confidence score of the first segment is higher than the third segment;
    randomly initiating a change of the road closure state of either the first segment or the third segment to open based on determining that the first segment and the third segment are further classified as semi-weakly closed and based on determining that the closure confidence score of the first segment is equal to the third segment;
    initiating a change of the road closure state of the first segment to open based on determining that the third segment is further classified as semi-weakly closed;
    initiating a change of the road closure state of the third segment to open based on determining that the first segment is further classified as semi-weakly closed; and
    initiating a change of the road closure state of both the first segment and the third segment to open based on determining neither the first segment nor the third segment is further classified as semi-weakly closed.

11. The method of claim 2, wherein the roadway graph is processed by sliding the unit across a successive three-segment portion of the graph.

12. The method of claim 1, wherein the roadway graph is a subgraph of a larger roadway graph so that the roadway graph does not contain an open road segment that is greater in length than a maximum interclosure distance.

13. The method of claim 1, wherein the one or more attributes include a link length, an expected traffic volume, a functional class, a closure status duration, or a combination thereof.

14. An apparatus for combining road closures detected in a road network comprising:
  at least one processor; and
  at least one memory including computer program code for one or more programs, the at least one memory and the computer program code configured to, with the at least one processor, cause the apparatus to perform at least the following,
  retrieve a roadway graph including one or more open segments and at least two closed segments, wherein the at least two closed segments are discontinuous;
  compute an importance weight for a plurality of road links of the one or more open segments and the at least two closed segments, wherein the importance weight is based on one or more attributes of the plurality of road links;
  compute a closure confidence score for the one or more open segments, the at least two closed segments, or a combination thereof based on the importance weight and a link closure confidence score for each of the plurality of links; and
  change or not change a road closure state of the one or more open segments, the at least two closed segments, or a combination thereof based on the closure confidence score and a minimum distance threshold between the at least two closed segments.

15. The apparatus of claim 14, wherein the apparatus is further caused to:
- perform a classification of the one or more open segments, the one or more closed segments, or a combination thereof as strongly closed, weakly closed, semi-weakly closed, strongly open, weakly open, semi-weakly open, or a combination thereof based on the closure confidence score,
- wherein semi-weakly closed is a subclassification of weakly closed and semi-weakly open is a subclassification of weakly open; and
- wherein the road closure state is changed or not changed based at least in part on the classification.

16. The apparatus of claim 14, wherein the roadway graph is a subgraph of a larger roadway graph so that the roadway graph does not contain an open road segment that is greater in length than a maximum interclosure distance.

17. The apparatus of claim 14, wherein the one or more attributes include a link length, an expected traffic volume, a functional class, a closure status duration, or a combination thereof.

18. A non-transitory computer-readable storage medium for combining road closures detected in a road network, carrying one or more sequences of one or more instructions which, when executed by one or more processors, cause an apparatus to perform:
- retrieving a roadway graph including one or more open segments and at least two closed segments, wherein the at least two closed segments are discontinuous;
- computing an importance weight for a plurality of road links of the one or more open segments and the at least two closed segments, wherein the importance weight is based on one or more attributes of the plurality of road links;
- computing a closure confidence score for the one or more open segments, the at least two closed segments, or a combination thereof based on the importance weight and a link closure confidence score for each of the plurality of links; and
- changing or not changing a road closure state of the one or more open segments, the at least two closed segments, or a combination thereof based on the closure confidence score and a minimum distance threshold between the at least two closed segments.

19. The non-transitory computer-readable storage medium of claim 18, wherein the apparatus is caused to further perform:
- performing a classification of the one or more open segments, the one or more closed segments, or a combination thereof as strongly closed, weakly closed, semi-weakly closed, strongly open, weakly open, semi-weakly open, or a combination thereof based on the closure confidence score,
- wherein semi-weakly closed is a subclassification of weakly closed and semi-weakly open is a subclassification of weakly open; and
- wherein the road closure state is changed or not changed based at least in part on the classification.

20. The non-transitory computer-readable storage medium of claim 18, wherein the roadway graph is a subgraph of a larger roadway graph so that the roadway graph does not contain an open road segment that is greater in length than a maximum interclosure distance.

* * * * *